US012509912B2

(12) United States Patent
Telang et al.

(10) Patent No.: US 12,509,912 B2
(45) Date of Patent: Dec. 30, 2025

(54) SINGLE DEGREE OF FREEDOM COMPONENTS FOR LOCK ASSEMBLIES

(71) Applicant: Schlage Lock Company LLC, Carmel, IN (US)

(72) Inventors: Ravi Telang, Karnataka (IN); Matthew Stonebraker, Bloomington, IN (US); Vishal Salitkumar Kusanale, Karnataka (IN); Nagesh Varadaraju, Karnataka (IN); Suresha Chandrasekharareddy, Karnataka (IN)

(73) Assignee: Schlage Lock Company LLC, Carmel, IN (US)

( * ) Notice: Subject to any disclaimer, the term of this patent is extended or adjusted under 35 U.S.C. 154(b) by 25 days.

(21) Appl. No.: 18/673,006

(22) Filed: May 23, 2024

(65) Prior Publication Data

US 2025/0361746 A1 Nov. 27, 2025

(51) Int. Cl.
*E05B 17/20* (2006.01)
*E05B 63/00* (2006.01)

(52) U.S. Cl.
CPC ...... *E05B 17/2003* (2013.01); *E05B 63/0056* (2013.01)

(58) Field of Classification Search
CPC ............. E05B 17/2003; E05B 63/0056; E05B 27/0075; E05B 29/0053
USPC .......................................................... 292/346
See application file for complete search history.

(56) References Cited

U.S. PATENT DOCUMENTS 2,796,281 A * 6/1957 Philpott .............. E05B 17/2003 292/346
3,731,506 A * 5/1973 Greene ............... E05B 17/2084 292/346
4,848,118 A * 7/1989 Tesone .................... E05B 15/10 292/346
5,003,727 A * 4/1991 Watten ................ E05B 15/0205 49/504
5,024,475 A * 6/1991 Francis ............... E05B 15/0205 292/346
5,335,950 A 8/1994 Mirshafiee et al.
(Continued)

OTHER PUBLICATIONS

International Search Report; ISA/US; International Application No. PCT/US2025/030733; Sep. 4, 2025; 3 pages.
(Continued)

*Primary Examiner* — Nathan Cumar
(74) *Attorney, Agent, or Firm* — Taft Stettinius & Hollister LLP

(57) ABSTRACT

A pick shield for a door lock assembly that is configured to be restricted to a single degree of freedom relative to a backing plate of the door lock assembly when being secured to at least a portion of the door lock assembly. The pick shield is configured to be secured to the door lock assembly using one or more shield mounts that have previously been secured, or are an integral part of, the backing plate. One or more attachment bodies of the pick shield are configured to engage with the shield mount(s) in a manner that, upon the pick shield being displaced to an attached position, securely attaches the pick shield to the door lock assembly. Thus, and installer can securely install the pick shield to the door lock assembly merely by a displacement of the pick shield about the single degree of freedom.

20 Claims, 24 Drawing Sheets

(56) References Cited

U.S. PATENT DOCUMENTS 5,540,070 A * 7/1996 Adelmeyer ......... E05B 63/0056 70/462
5,581,948 A * 12/1996 Simonsen ................. E06B 1/52 16/388
5,761,937 A * 6/1998 Adelmeyer ........... E05B 55/005 292/DIG. 60
6,116,665 A * 9/2000 Subliskey ............... E05C 3/046 292/241
6,502,436 B2 * 1/2003 Beatty ....................... E05B 9/08 70/381
6,568,231 B1 5/2003 Huang
6,834,897 B1 * 12/2004 Walker ................ E05B 15/0205 292/340
6,901,706 B2 * 6/2005 Olberding ................. E05D 5/06 49/460
8,510,995 B2 * 8/2013 Fulton ................. E05B 17/2084 292/DIG. 55
8,534,103 B2 * 9/2013 Brooks ................. E05B 13/001 70/423
8,601,839 B1 * 12/2013 Liu ......................... E05B 55/12 70/151 R
9,033,378 B2 * 5/2015 Jenkins ................. E05C 19/188 292/288
10,633,897 B2 * 4/2020 Liang .................. E05B 65/0841
11,459,796 B2 * 10/2022 Schmück ................ E05B 63/08
11,732,501 B1 * 8/2023 Ozier .................. E05B 15/0205 70/408
12,297,659 B2 * 5/2025 Huang ...................... E05B 9/02
2002/0108408 A1 * 8/2002 Beatty ....................... E05B 9/08 70/370
2004/0245788 A1 12/2004 Lin
2007/0180876 A1 8/2007 Shen
2009/0025436 A1 1/2009 Roth et al.
2011/0316291 A1 * 12/2011 Loughlin .............. E05B 67/383 292/346
2021/0054660 A1 * 2/2021 Hsu ....................... E05B 15/022

OTHER PUBLICATIONS

Written Opinion of the International Searching Authority; ISA/US; International Application No. PCT/US2025/030733; Sep. 4, 2025; 10 pages.

* cited by examiner

SINGLE DEGREE OF FREEDOM COMPONENTS FOR LOCK ASSEMBLIES

TECHNICAL FIELD

The present disclosure generally relates to lock assemblies, and more particularly, but not exclusively, to components of lock assemblies that are configured for secure affixing to the lock assembly via single degree of freedom.

BACKGROUND

Lock assemblies can assist with controlling access to, or passage through, an opening. For example, lock assemblies in the form of door lock assemblies can assist in controlling whether an associated door can, or can not, be opened. An example of such door lock assemblies are spring-loaded locks. With spring-loaded locks, when the door to which the lock device is attached is in a closed position, a spring force can facilitate a latch of the lock device being extended into an opening in an adjacent door jamb. With the latch in an extended position within the opening of the door jamb, the lock device can be locked so that the lock device prevents the latch from being retracted out from the door jamb. Lock devices in the form of deadbolts can similarly be configured for linear displacement between retracted/unlocked and extended/locked positions. Moreover, the door can be locked in a closed position relative to the door jamb by the deadbolt being selectively extended into an opening in the door jamb.

With both spring-loaded and deadbolt locks, among other types of lock devices, the lock devices can thus be unlocked via linear displacement of the associated latch or deadbolt to their retracted position. Such designs can be particularly susceptible to tampering, including lock picking wherein an illicit attempt is made to unlock the lock device using a pick or other device to pull the latch or deadbolt to the retracted position.

Past attempts to address such tampering issues have included an installer of the lock device using a hand tool(s), during installation of the lock device, to add additional components to the lock device. Yet, such hand tools can be cumbersome for at least some installations and/or installers. Further, the steps involving operating such hand tools during lock installation can result in inadvertent movement of at least a portion of the lock device, including at least a portion of the lock device falling or popping out of the associated cross bore in the door in which the lock device is being installed, or from the hand of the installer. Such inadvertent movement of the lock device can be costly, including, for example, resulting in damage to the face plate or other exterior decorative features of the lock device. In certain instances, such damage can necessitate purchasing replacements parts for that damaged components, if not replacement of the entire lock device, thereby increasing the cost of the lock device and associated installation and the installation time.

SUMMARY

The present disclosure may comprise one or more of the following features and combinations thereof.

In one embodiment of the present disclosure, a pick shield is disclosed for a door lock assembly that includes a bolt portion having a bolt and a shield mount securely coupled to a backing plate. The pick shield can include a shield that at least partially defines a cavity of the pick shield, the cavity being sized to receive placement of at least a portion of the bolt portion. The shield can extend above or below at least a portion of the bolt portion at a location that accommodates at least a portion of the bolt being extendable from the cavity in a direction that is generally perpendicular to a central longitudinal axis of the pick shield. The pick shield can further include an attachment body having an arm portion and an aperture portion. The arm portion can inwardly extend into the cavity in at least a direction toward the central longitudinal axis of the pick shield. The aperture portion can be configured to restrict, with the shield mount securely affixed to the backing plate, the pick shield to a single degree of freedom relative to at least the backing plate as the pick shield is displaced with at least a portion of the shield mount in the aperture portion from a detached position to an attached position. Additionally, the attachment body can be further configured to securely retain a position of the pick shield relative to at least the backing plate at least upon the pick shield reaching the attached position in a manner that resists movement of the pick shield independent of the backing plate.

In another embodiment, a pick shield is disclosed for a door lock assembly that includes a bolt portion having a bolt and a shield mount securely mounted to a backing plate. The pick shield can include an outer wall comprising an upper shield and a lower shield. The outer wall can define a cavity sized to receive placement of at least a portion of the bolt portion. Additionally, a recess can be positioned between the upper shield and the lower shield at a location that accommodates passage of at least a portion of the bolt out of the cavity through the recess. The pick shield can further include an interference tab that outwardly extends beyond the outer wall to provide the pick shield with an adjustable interference size that is larger than a corresponding size of the outer wall. The interference tab can be configured for selective displacement from a rest position to a displaced position by an engagement of the interference tab with a wall that defines at least a portion of the cross bore. Additionally, the interference tab can be configured to exert an at least outwardly directed force against the wall that assists in a retention of a position of the pick shield within the cross bore.

Additionally, in another embodiment, a method is provided for securely coupling a pick shield to a plate of a door lock assembly that includes a bolt portion having a bolt. The method can include securing a shield mount to the plate and placing a portion of the shield mount within a portion of an aperture portion of an attachment body of a pick shield. The pick shield can have an outer wall that at least partially defines a cavity and a shield, the cavity being sized to receive placement of at least a portion of the bolt portion at a location above or beneath the shield and to accommodate selective extension of at least a portion of the bolt out of the cavity in a direction that is generally perpendicular to a central longitudinal axis of the pick shield. Additionally, with a portion of the secured shield mount in the aperture portion, the pick shield can be displaced from a detached position and toward an attached position. The aperture portion can be configured to confine the pick shield to a single degree of freedom of movement relative to at least the plate as the pick shield is being displaced from the detached position to the attached position. Further, by displacing the pick shield to the attached position, the pick shield can be securely affixed relative to at least the plate in a manner that resists displacement of the pick shield independent of displacement of the plate.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE ILLUSTRATIVE EMBODIMENTS

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

Figure 1B:
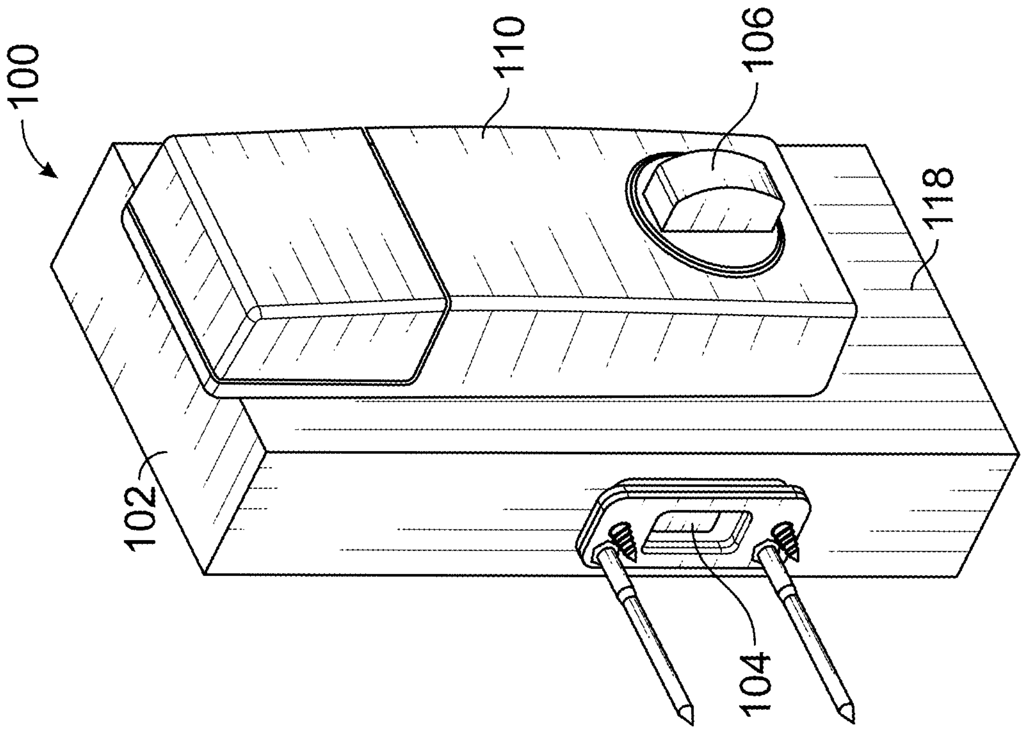
FIGS. 1A and 1B illustrate front and back side perspective views, respectively, of an exemplary door lock assembly secured to a door.
Figure 1A:
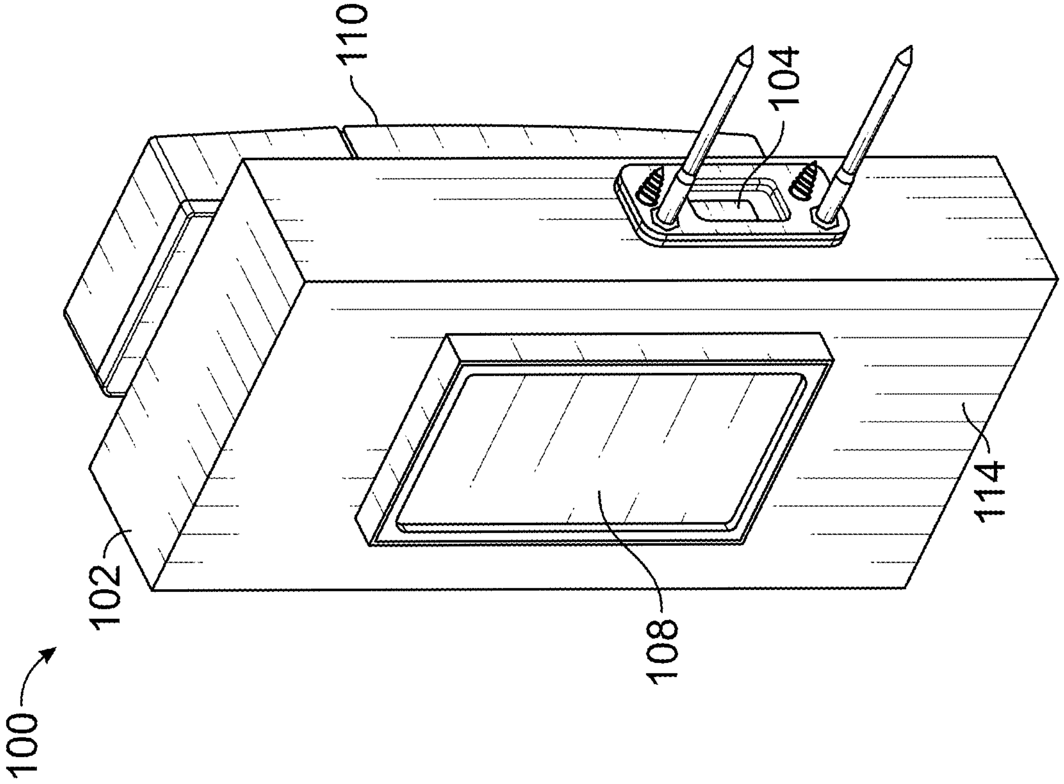

FIGS. 1A and 1B illustrate front and back side perspective views, respectively, of an exemplary door lock assembly 100 secured to a door 102. The illustrated door lock assembly 100 is configured to secure the door 102 in a closed position about at least a portion of a passageway that can be generally defined by a door jamb or other suitable fixed structure. Moreover, in the closed position, the door 102, which can be a residential or commercial door, among other types of doors, can prevent ingress/egress through such a passageway, thereby controlling access to associated adjacent areas on opposing sides of the door 102.

The illustrated door lock assembly 100 includes a latch or bolt 104, collectively referred to herein as a bolt 104, that can be linearly displaced between a retracted position, as shown in at least FIG. 1A, and an extended position. According to the illustrated embodiment, when the door 102 is in the closed position, the bolt 104 can be in the extended position, wherein the bolt 104 can extend into an opening in the door jamb, thereby at least temporarily securing the door 102 in the closed position. The door lock assembly 100 can further be configured to be selectively locked. Moreover, when the door is in the closed position and the door lock assembly 100 is locked, the door lock assembly 100 can be configured to resist the bolt 104 from being displaced from the extended position to the retracted position. Moreover, when locked, the door lock assembly 100 can resist the bolt 104 from being retracted out of the opening in the door jamb.

The bolt 104 can be linearly displaced between the extended and retracted positions in a variety of manners. For example, a force can be imparted to move the bolt 104 from any one, or a combination of, a motor internal to the door lock assembly 100, a key, and a user device, such as, for example, a thumb turn 106, as illustrated in FIG. 1B, among other user devices. Such force may be provided directly or indirectly to the bolt 104. For example, according to certain embodiments, a driver can be selectively operated to impart a force to a bolt driving mechanism that is configured to displace the bolt 104 from the extended position to the retracted position, and vice versa. FIGS. 1A and 1B also depict a strike and strike reinforce that can be secured, via use of fasteners, to the door jamb.

Figure 2:
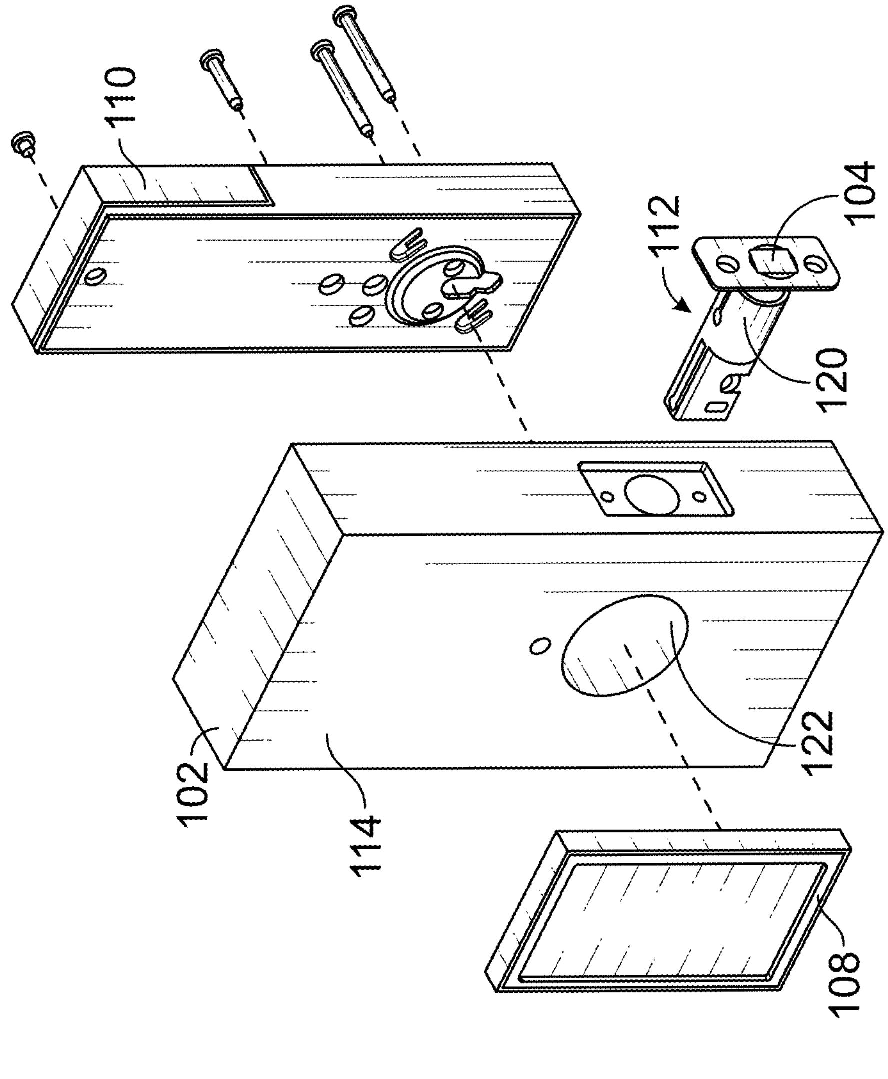
FIG. 2 illustrates an exploded view of a portion of the door lock assembly shown in FIG. 1A.

FIG. 2 depicts an exploded view of the door lock assembly 100 that includes a first or outer side trim portion 108, a second or inner side manipulator portion 110, and bolt portion 112. The trim portion 108 can be configured to be adjacent to, or abut, a first side 114 of the door 102. Further, according to certain embodiments, the trim portion 108 can include a key cylinder having a keyhole used to receive a key that which can be used to manipulate the bolt 104 to secure the door 102. The trim portion 108 can alternatively and/or additionally include a keypad 116 (shown in the illustrated embodiment), that, if an appropriate pass code is provided, can be used to activate a motor to drive the bolt 104. Additionally, or alternatively, the trim portion 108 can be a credential device, such as, for example, a card reader, configured to activate a motor to drive the bolt 104 in response to receipt and/or detection by the trim portion 108 or other portion of the door lock assembly 100 of proper authentication information.

The back side manipulator portion 110 of the illustrated embodiment is configured to can be secured to the door 102 at, or against a second side 118 (FIG. 1B) of the door 102. According to certain embodiments, the back side manipulator portion 110 can be structured to receive a powered module that can be used for displacing the bolt 104 to the extended and retracted positions. In this example, the powered module can include an energy source for powering the motor that provides a force, such as, for example, to the driver, that can be directly or indirectly transmitted for the displacement of the bolt 104. Additionally, the thumb turn 106 can be directly or indirectly coupled to the bolt 104 or driver such that operation of the thumb turn 106 can provide a force used for at least displacing the bolt 104 to the extended or retracted position, or vice versa.

The bolt portion 112 can include a housing 120 for enclosing at least a portion of the bolt 104, and can include the bolt driving mechanism that is interposed between the bolt 104 and the driver of the door lock assembly 100. The housing 120, as well as at least a portion of the bolt 104, are configured for placement within the cross bore 122 within the door 102. According to at least certain types of doors, the cross bore 122 can have a generally cylindrical cross-sectional shape.

Figure 3:
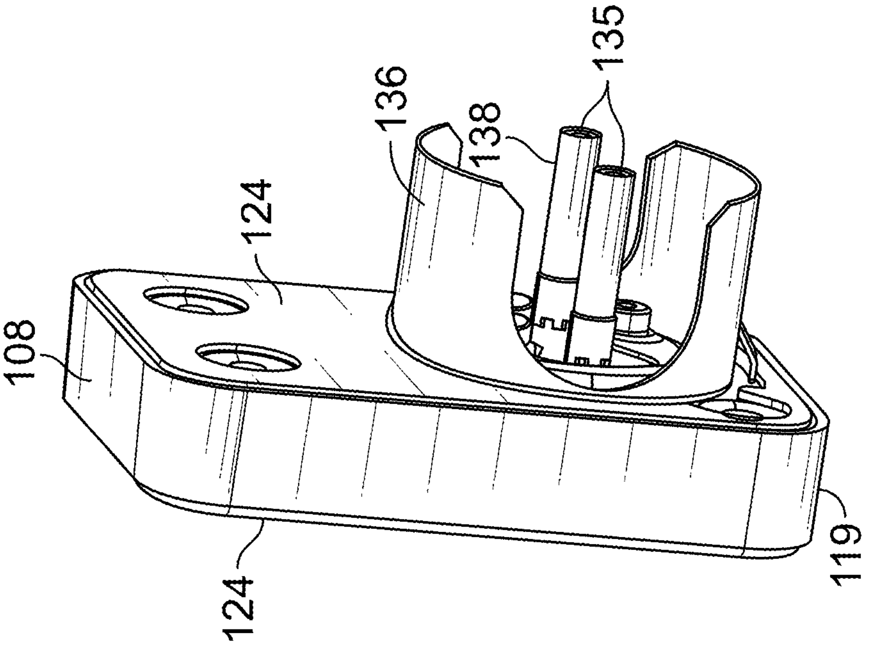
FIG. 3 illustrates a rear side perspective view of an exemplary trim portion for the illustrated door lock assembly.
Figure 4:
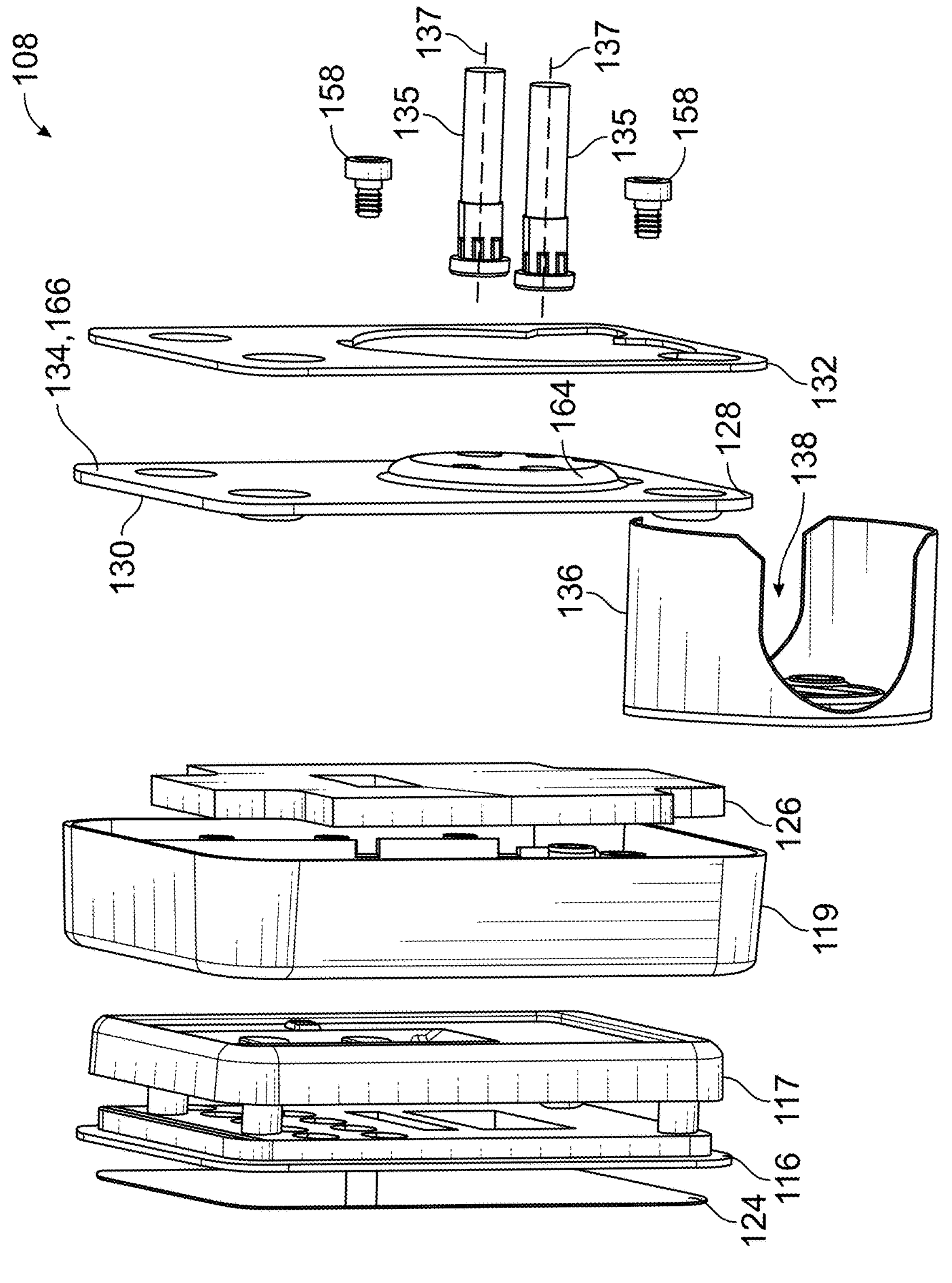
FIG. 4 illustrates an exploded view of a portion of the trim portion of the door lock assembly shown in FIG. 2.
Figure 5:
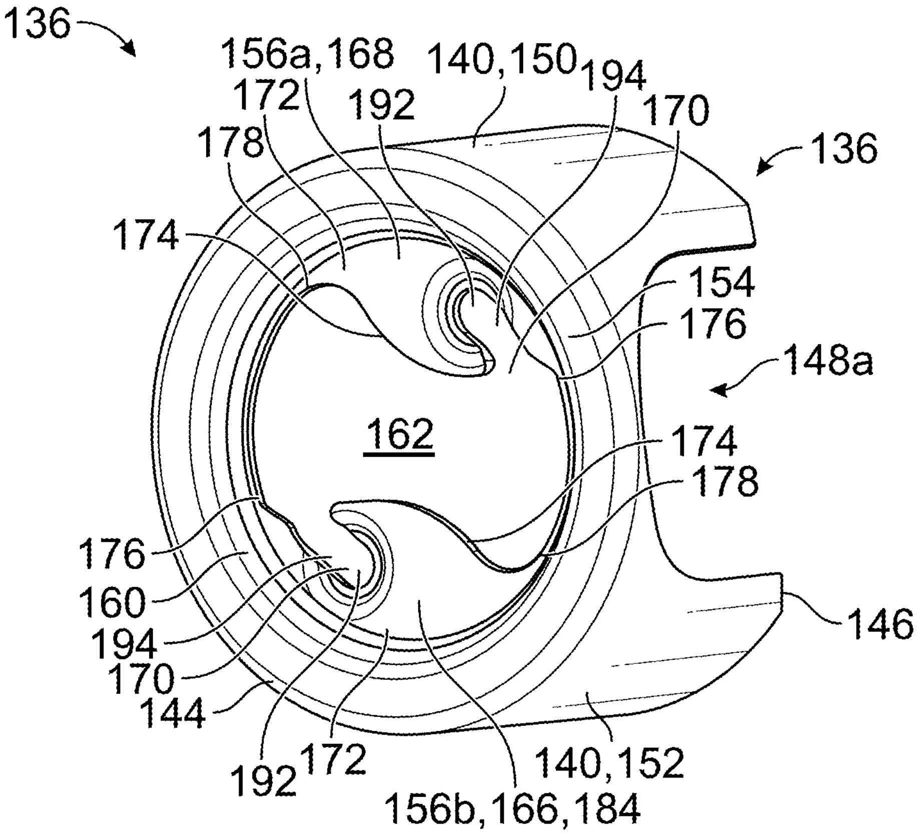
FIG. 5 illustrates a front side perspective view of an exemplary embodiment of a pick shield for the trim portion of the door lock assembly.
Figure 6:
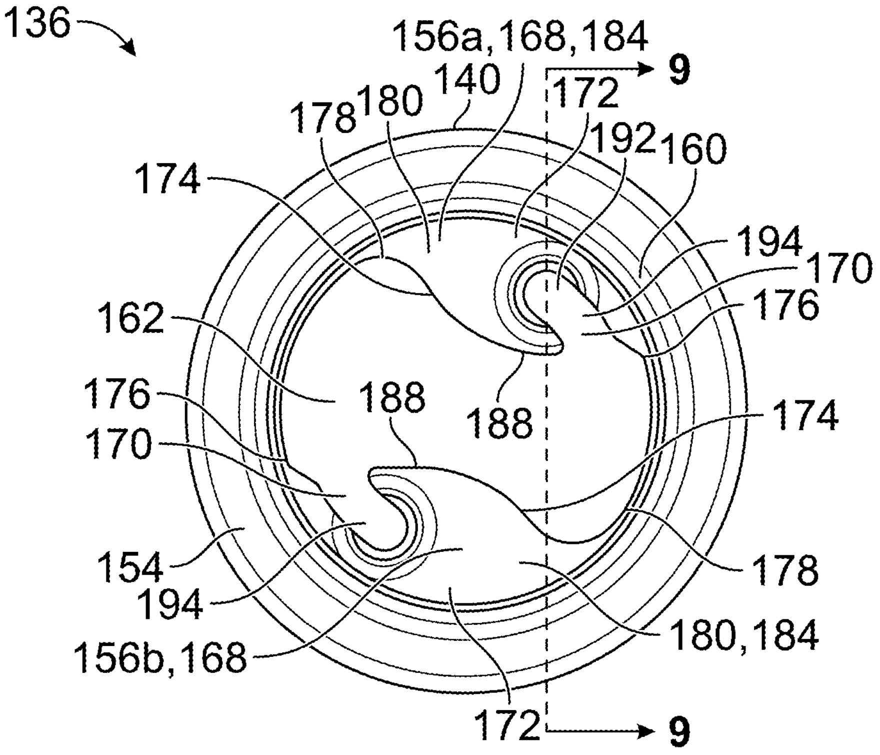
FIGS. 6 and 7 illustrate front and rear views, respectively, of the pick shield shown in FIG. 5.

Referencing the exemplary trim portion 108 of the exemplary door lock assembly 100 shown in FIGS. 3 and 4, the illustrated trim portion 108 can include a face plate or cover 124 that can be placed against a keypad 116, the keypad 116 being sized to be positioned within at least a front end portion of an inner housing 117, a rear end portion of the inner housing 117 receiving and/or abutting a portion of a support plate 126. An outer housing 119 can generally receive and/or extend around at least a portion of the face plate 124, keypad 116, inner housing 117, and support plate 126, as generally shown by FIG. 3. A backing plate 128 can be secured, such as, for example, via one or more mechanical fasteners, including bolts, screws, or pins, to the support plate 126 such that a first side 130 of the backing plate 128 is adjacent to, if not abuts, the support plate 126. Additionally, according to certain embodiments, a gasket 132 can be positioned adjacent to a second side 134 of the backing plate 128 such that the gasket 132 can be positioned between the backing plate 128 and the door 102. The exemplary trim portion 108 also is illustrated as having a pair of mounting posts 135, which can each be configured to receive a mating mechanical fastener, such as, for example, a bolt, in connection with securely attaching the trim portion 108 to the back side manipulator portion 110. However, the trim portion 108 to the back side manipulator portion 110 can be securely coupled to each other in a variety of other manners, including, but not limited to, via use of other mechanical fasteners, including, for example, a mounting screw. Additionally, the components of the trim portion 108 can be constructed from a variety of materials, including, but not limited to metallic, non-metallic materials, and/or a hybrid of metallic and non-metallics materials, as well as various combinations thereof, among other materials.

As seen in FIGS. 3 and 4, the door lock assembly 100 can further include a pick shield 136 that can be secured to, and extend away from, the backing plate 128. Moreover, the pick shield 136 is configured to extend from the backing plate 128 and into the cross bore 122 in the door 102, wherein the pick shield 136 can extend around and/or over at least a portion of the bolt portion 112. By extending over at least a portion of the bolt portion 112, the pick shield 136 can provide a barrier or shield against illicit access to the bolt driving mechanism or the bolt 104 that is housed within a cavity 138 of the pick shield 136, including preventing access to the bolt drive mechanism by a pick, among other tools used in connection with tampering with locks. Such prevention of access to the bolt drive mechanism can thus prevent an authorized user from exerting a force onto at least a portion of the bolt drive mechanism that could otherwise facilitate a retraction of the bolt 104, including retracting the bolt 104 out from an extended position within the door jamb. Further, the pick shield 136 can be constructed from a variety of metallic or non-metallic materials, including, but not limited to, sheet steel or plastics, among other materials.

As seen in at least FIGS. 5-9, according to the illustrated embodiment the pick shield 136 includes an outer wall 140 that extends about a central longitudinal axis 142 (FIG. 9) between opposing first and second ends 144, 146 of the pick shield 136. The first and second ends 144, 146 can generally define a linear length of the pick shield 136 that is similar, if not smaller, than a corresponding length of the cross bore 122 between the opposing first and second sides 114, 118 of the door 102. The outer wall 140 can generally define the cavity 138 of the pick shield 136. Further, the outer wall 140 may be non-continuous around at least a portion of an outer periphery of the outer wall 140 so as to provide one or more recesses 148*a*, 148*b* that are configured to accommodate passage of the bolt portion 112 into the cavity 138 of the pick shield 136, which can generally extend along the length of the pick shield 138, and, moreover, between the opposing first and second ends 144, 146. According to such an embodiment, each recess 148*a*, 148*b* can extend through the second end 146 of the outer wall 140. Moreover, in the illustrated embodiment, the pick shield 136 can have a pair of recesses 148*a*, 148*b* at opposite diametric positions, and, moreover, at opposing sides of the outer wall 140, as seen in the illustrated embodiment. Such recesses 148*a*, 148*b* can thus at least partially separate an upper shield 150 and a lower shield 152 formed by the outer wall 140. Moreover, as seen in the figures, the upper shield 150 and lower shield 152 can be at opposing positions such that the upper shield 150 is positioned above the lower shield 152. Alternatively, according to other embodiments, rather than having a tubular configuration, the outer wall 140 can comprise an upper shield 150 and a separate lower shield 152, which may, or may not, be part of the same monolithic structure.

According to certain embodiments, the pick shield 136 can further include a face wall 154 at the first end 144 of the pick shield 136. Moreover, according to certain embodiments, the face wall 154 can inwardly extend in a direction that is generally not parallel to the central longitudinal axis 142 and be positioned to abut an adjacent portion of the backing plate 128 or gasket 132 when the pick shield 136 is secured to the backing plate 128.

The pick shield 136 can further include one or more attachment bodies 156 that are configured for securing the pick shield 136 to at least the backing plate 128. Moreover, each attachment body 156, or a plurality of attachment bodies 156, are configured to accommodate the pick shield 136 being constrained to having a single degree of freedom in terms of movement of the pick shield 136 relative to at least the backing plate 128, including associated shield mounts 158, in connection with both the attachment and detachment of the pick shield 136 to the backing plate 128. Further, the configuration of the attachment body(ies) 156 can at least partially determine the particular degree of freedom for the pick shield 136 in terms of the direction the pick shield 136 can move to be secured to, or detached from, the backing plate 128, as discussed below.

Figure 9:
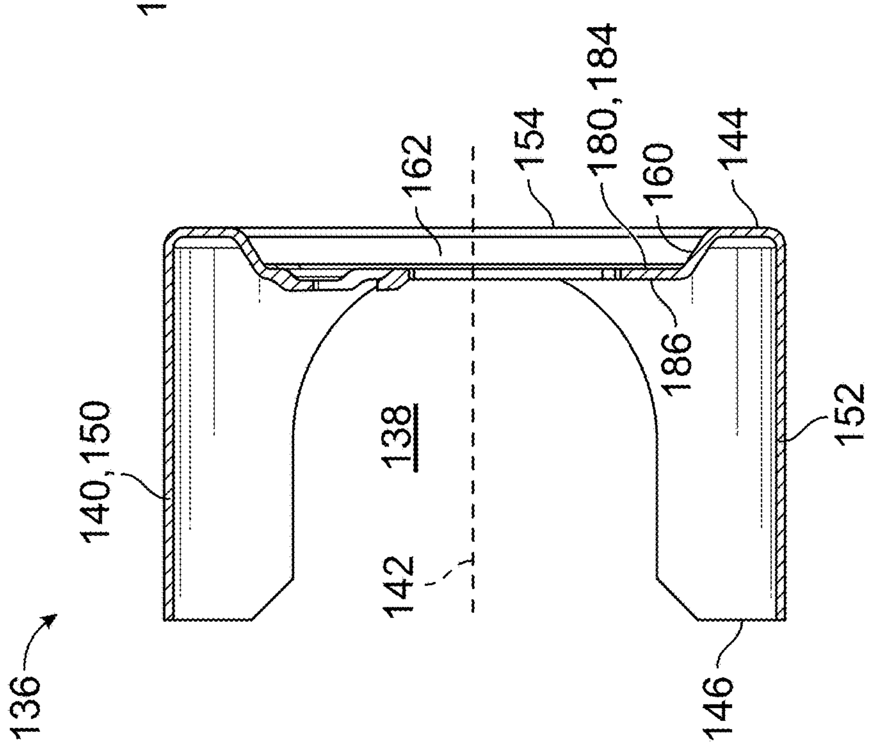
FIG. 9 illustrates a cross-sectional view of the pick shield taken along line A-A in FIG. 6.

In the illustrated embodiment, the pick shield 136 has at least one attachment body, such as, for example, a first attachment body 156*a* and a second attachment body 156*b*. Further, the attachment bodies 156 can, according to certain embodiments, be inwardly offset from the face wall 154 and positioned within a portion of the cavity 138. Moreover, as seen in FIG. 9, the attachment bodies 156 are coupled to the face wall 154 via a transition wall 160 that is configured to inwardly offset the attachment bodies 156 relative to the face wall 154 and into the cavity 138. The extent to which the transition wall 160 offsets the attachment bodies 156 can be based on a variety of criteria. For example, according to certain embodiments, the transition wall 160 can be configured to generally define an orifice 162 of the cavity 138 at the first end 144 of the pick shield 136 that is sized to receive at least a portion of a hub 164 that outwardly projects from a generally planar back wall 166 of the second side 134 of the backing plate 128, as seen, for example, in FIGS. 12A and 12B. Accordingly, the extent to which the attachment bodies 156 are inwardly offset or recessed into the cavity 138 can be based on a variety of criteria, including, for example, the extent the hub 164 extends from the back wall 166 of the backing plate 128 and whether either or both the attachment bodies 156 and the transition wall 160 are, or are not, to abut or be separated from the hub 164. Additionally, according to certain embodiments, at least the attachment bodies 156 can be offset from the face wall 154 by a distance that allows the face wall 154 to abut against a portion of the back wall 166 of the backing plate 128 when the pick shield 136 is secured, via engagement with, or receipt of, the shield mounts 158, which according to certain embodiments can comprise the mounting posts 135, to the backing plate 128.

With respect to the embodiment of the attachment bodies 156*a*, 156*b* (generally referred to as attachment body 156) shown in at least FIGS. 5-10, each attachment body 156 can include an arm portion 168 and an aperture portion 170. The arm portion 168 can comprise the portion of the attachment body 156 that at least inwardly extends, relative to at least the central longitudinal axis 142, into the cavity 138. For example, the arm portion 168 can include, as well as be generally defined by, a base portion 172 and a side wall 174. The base portion 172 can be coupled to one or more of the inner surface of the outer wall 140, upper or lower shield 150, 152, face wall 154, or transition wall 160. The side wall 174 can generally define an anterior and posterior shape of the arm portion 168, as seen, for example, in FIGS. 6 and 7. Further, the side wall 174 can comprise a single wall that may transition in a plurality of directions, or comprise a plurality of wall segments that may, or may not, extend in either or both similar and/or dissimilar directions of other wall segments.

Figure 10:
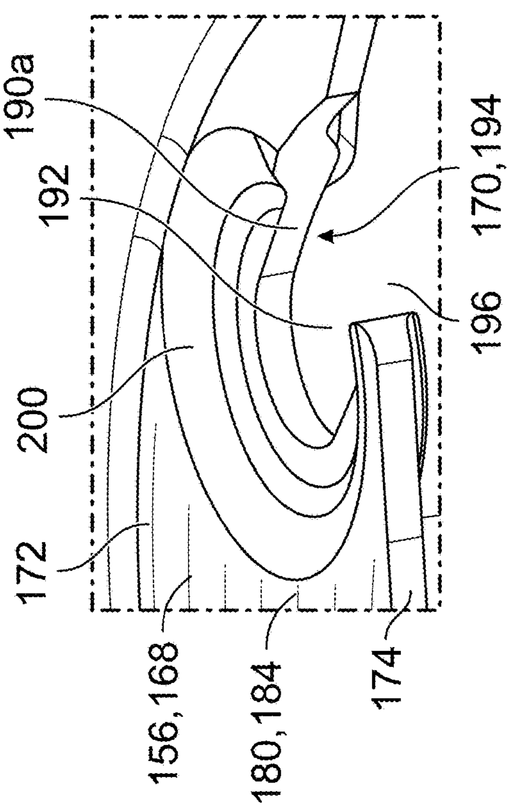
FIG. 10 illustrates a front side perspective view of a portion of the pick shield shown in FIG. 5.

In the embodiment shown in FIGS. 5-10, a portion of the side wall 174 extends from a first end 176 of the side wall 174 of the arm portion 168 to a second end 178 of the arm portion 168. Further, the curved configuration of the side wall 174 can, in this example, be truncated around the second end 178. Additionally, according to such an embodiment, around a mid point of the side wall 174, the side wall 174 can reach an apex 188 at which the side wall 174 reaches its largest distance away from the base portion 172, and, moreover, the attachment body 156 is closest to the central longitudinal axis 142 of the pick shield 136. As seen in FIGS. 9 and 10, according to certain embodiment, the arm portion 168 can further comprise a generally planar wall 180 that extends between opposing first and second sides 184,

186 of the arm portion 168 and from the base portion 172 to the apex 188 in a direction that is generally orthogonal to the central longitudinal axis 142.

According to the illustrated embodiment, the aperture portion 170 can include a pair of opposing slot walls 190*a*, 190*b* and an aperture opening 192. The slot walls 190*a*, 190*b* can, according to certain embodiments, define a passageway 194 that extends from the aperture opening 192 and through the side wall 174 at a location between the apex 188 and one of the first end 176 and the second end 178 of the side wall 174. Further, according to certain embodiments, the slot walls 190*a*, 190*b* can define an inlet 196 at an entry to the passageway 194 that extends through the side wall 174. As discussed below, the passageway 194 is configured to accommodate sliding displacement of a portion of a shield mount 158 as the pick shield 156 is rotatably displaced in a first direction of rotation (as generally indicated by "$r_1$" in FIG. 12B) to a position at which a portion of the shield mount 158 is received, and positioned, in the aperture opening 192. The slot walls 190*a*, 190*b* can further define the aperture opening 192. For example, the aperture opening 190*a*, 190*b* can be an area at which the slot walls 190*a*, 190*b* are joined or are otherwise brought or connected together.

Figure 7:
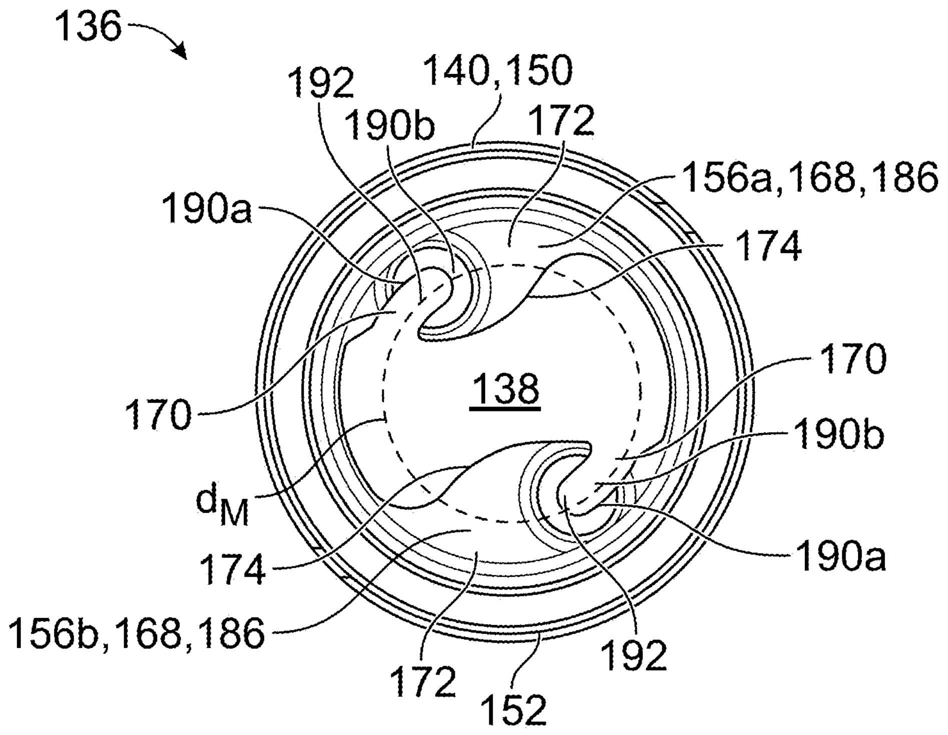
Figure 8:
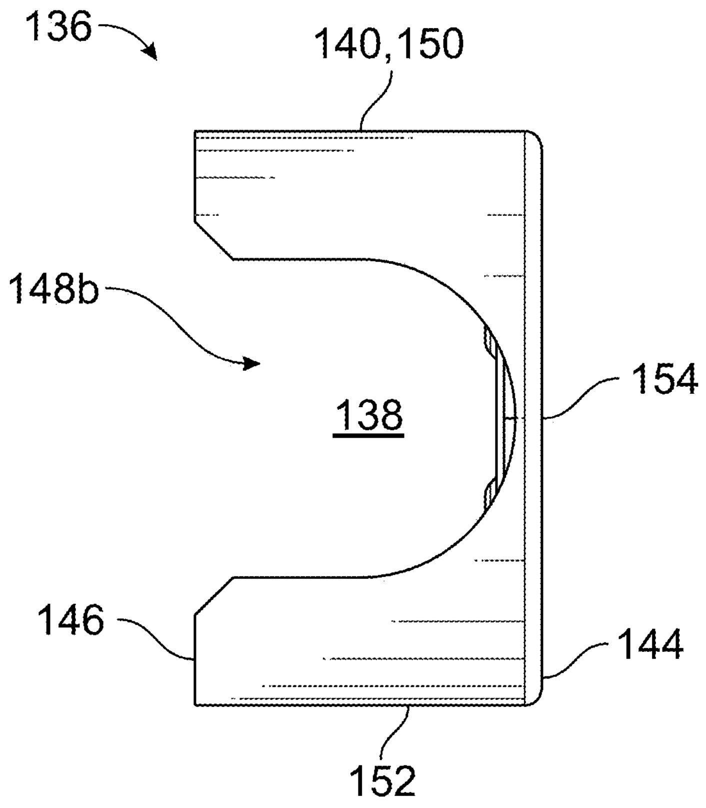
FIG. 8 illustrates a first side view of the pick shield shown in FIG. 5, wherein an opposing second side view of the pick shield can be generally a mirror image of the first side view.
Figure 12B:
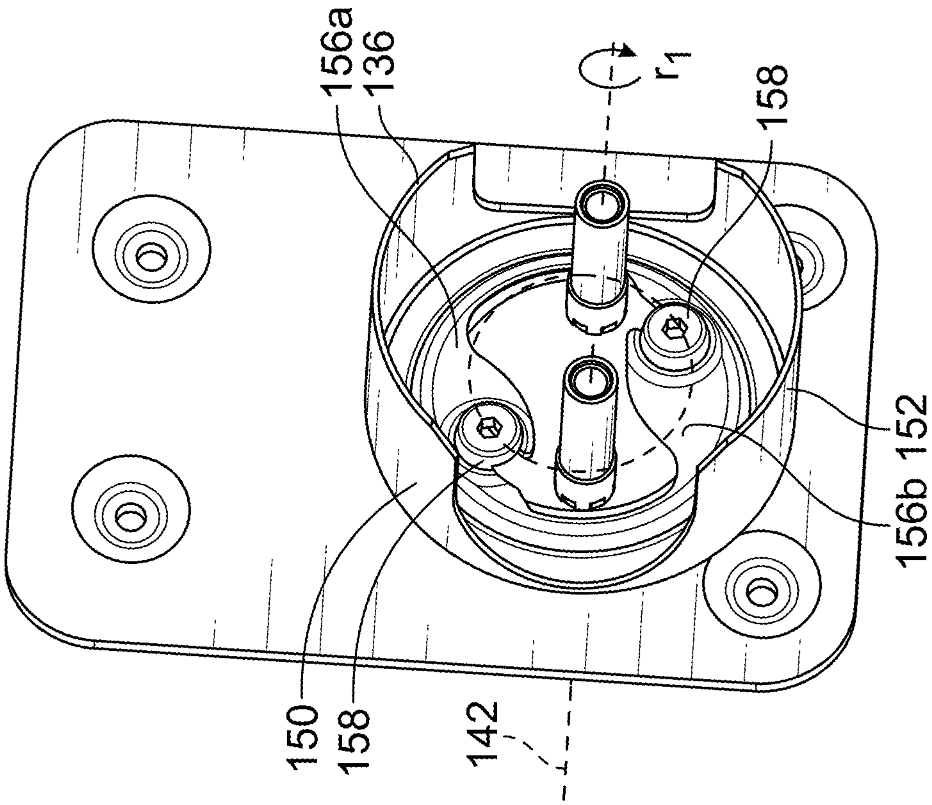
FIG. 12B illustrates a rear side perspective view of the pick shield shown in FIG. 11 secured to the backing plate shown in FIG. 12A.
Figure 12A:
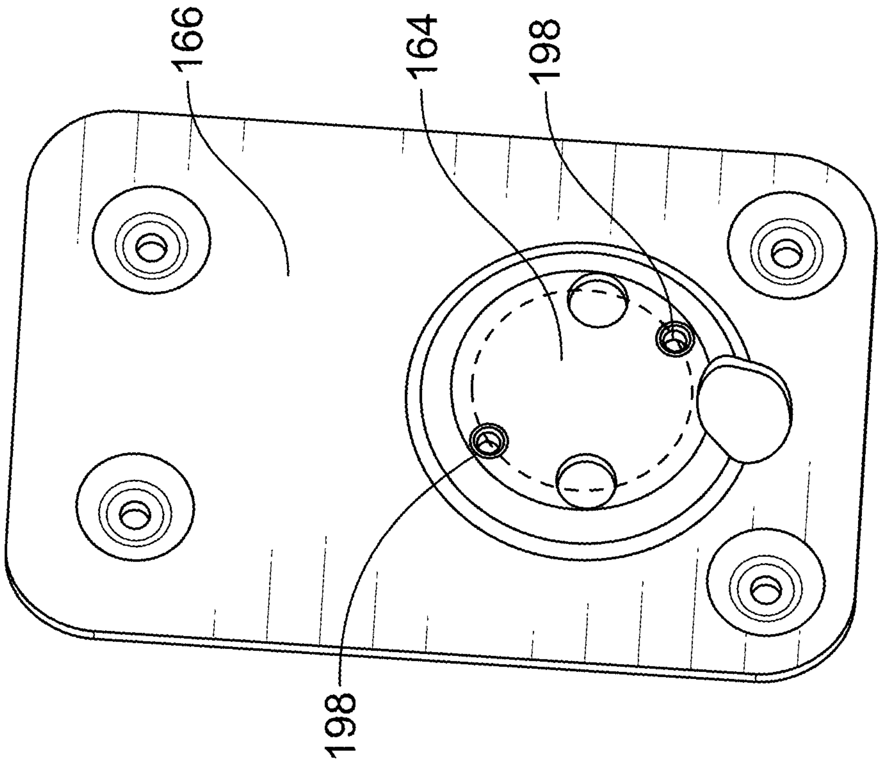
FIG. 12A illustrates a rear side perspective view of a portion of an exemplary backing plate.
Figure 13:
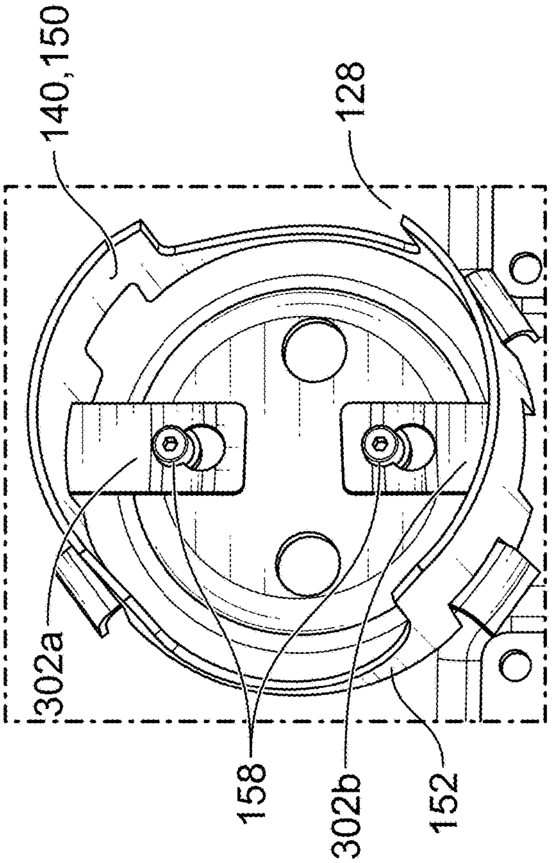
FIG. 13 illustrates a rear side perspective view of a portion of an assembly comprising a second embodiment of a pick shield securely affixed to a backing plate.
Figure 14:
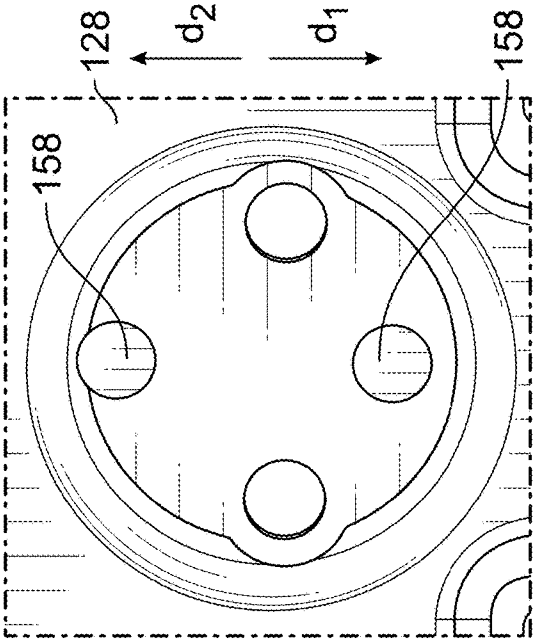
FIG. 14 illustrates a front view of a portion of the backing plate and shield mounts shown in FIG. 13.

As generally indicated by at least FIGS. 7, 12A, and 12B, the center of the aperture opening 192 of each the attachment bodies 156 can be positioned along a mounting diameter (dm) that corresponds to a mounting diameter at which the mating shield mounts 158 are, or will be, arranged before the pick shield 136 is secured to the backing plate 128 and/or corresponding mounting holes 198 in the backing plate 128. Additionally, the aperture opening 192 for one or more of the attachment bodies 156 can be positioned such that, when a corresponding shield mount 158 is positioned in the aperture opening 192 to securely affix the pick shield 136 to at least the backing plate 128, the recesses 148*a*, 148*b* and/or upper and lower shields 150, 152 are positioned to accommodate passage of at least the bolt portion 112 to extend into the cavity 138 such that the pick shield 136 shields or covers at least the housing portion 120 of the portion of the bolt portion 112. Moreover, according to such an embodiment, the aperture opening 192 is positioned such that, when secured to the backing plate 128, the pick shield 146 houses at least a portion of the bolt portion 112 within the cavity 138 at a location that accommodates the bolt portion 112 being displaced between extended and retracted positions in connection with the locking and unlocking of the door 102.

The passageway 194 can be curved, or otherwise extend, about a portion of the mounting diameter (dm), while also having a width between the opposing slot walls 190*a*, 190*b* so as to accommodate passage of a portion of each shield mount 158 through an inlet 196 of the passageway 194. Such a curved shape of the passageway 194, as well as the width the passageway 194, can accommodate a portion of a shield mount 158 passing through the passageway 194 and to the aperture opening 192 as the pick shield 136 is rotatably displaced relative to the backing plate 128.

As seen in FIG. 10, according to certain embodiments, the first side 184 of the planar wall 180 of the arm portion 168 can have a pocket 200 that extends around the aperture opening 192. The pocket 200 can be provided by a depression in the first side 184 of the planar wall 180. Further, the pocket 200 can be configured such that the planar wall 180, at the area of the pocket 200, both abuts and extends over at least a portion of the shield mount 158. Such a configuration can further secure the pick shield 136 to the shield mount 158. Alternatively, rather being a pocket 200, the area around the aperture opening 192 can outwardly project towards the head portion 208 of the shield mount 158 in a manner that increases a resistance or provides a pressing force by the attachment body 156 against the back wall 212 of the head portion 208 of the shield mount 158 in a manner that can resist movement of the pick shield 136 relative to the shield mount 158, and thus relative to the backing plate 128.

According to certain embodiments, a portion of the first side 184 of the planar wall 180 of the arm portion 168 adjacent to, if not at least partially defining, the slot walls 190*a*, 190*b* can be upwardly sloped from the inlet 196 of the passageway 194 to the pocket 200 around the aperture opening 192 such that the planar wall 180 provides a ramp around at least a portion of the passageway 194. The sloped ramp can be configured such that, as the sloped ramp is engaged by a portion of the shield mount 158 as the shield mount 158 passes through the passageway 194 and toward the aperture opening 192, the planar wall 180 is at least partially deflected in a direction at toward the backing plate 128 as the pick shield 136 is rotatably displacement of the relative to the backing plate 128. According to such an embodiment, the planar wall 180 is configured such that, at least upon the shield mount 158 reaching the aperture opening 192, and moreover, the pocket 200, the planar wall 180 can generally return to its pre-deflected configuration, wherein a portion of the shield mount 158 is seated in the pocket of the planar wall 180, as discussed above. Such a ramp configuration can increase resistance to inadvertent detachment of the pick shield 136 to the shield mount 158. For example, an end of the ramp can provide a barrier that, when the shield mount 158 is positioned in the pocket 200 and the planar wall 180 has returned its pre-deflected configuration, can assist in providing a resistance or barrier to the pick shield 136 being rotated relative to the backing plate 128 in a second direction of rotation that is opposite to the first direction of rotation ($r_1$), and thereby assist in preventing the pick shield 136 from being detached from the backing plate 128.

Figure 11:
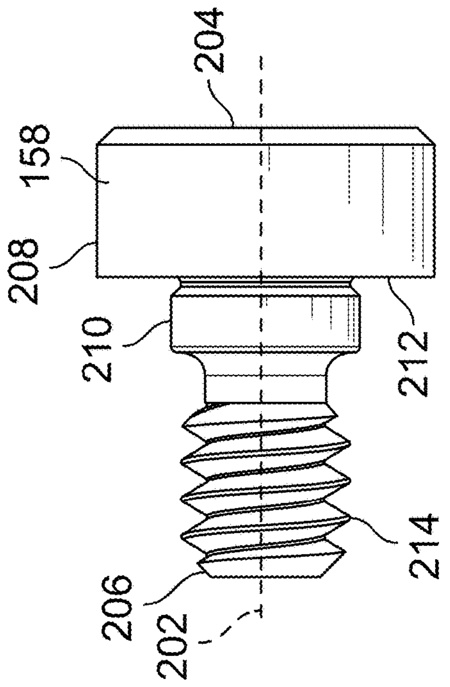
FIG. 11 illustrates a side view of an exemplary shield mount.

FIG. 11 illustrates a side view of an exemplary shield mount 158. The shield mount 158 shown in FIG. 11 extends about a central axis 202 between a first end 204 and a second end 206 of the shield mount 158. According to certain embodiments, when the shield mount 158 and pick shield 136 are securely attached to the backing plate 128, the central axis 202 of the shield mount 158 can be generally parallel to, and offset from, the central longitudinal axis of the pick shield 136.

A head portion 208 of the shield mount 158 can be positioned between the first end 204 and a shoulder portion 210 of the shield mount 158. The head portion 208 can have a size, such as, for example, a diameter, that is larger in at least one direction than the aperture opening 192. Such a size difference between the head portion 208 and the aperture opening 192 can assist in the shield mount 158 being constrained to one degree of freedom movement relative to the backing plate 128, including the associated shield mounts 158, in connection with both the attachment and detachment of the pick shield 136 to the backing plate 128. For example, the size difference between the head portion 208 and the aperture opening 192, as well as the width of the slot walls 190*a*, 190*b* that define the passageway 194, can, for example, allow the head portion 208 to provide a barrier that prevents the pick shield 136 from being literally displaced relative to the backing plate 128 in connection with attaching or detaching the pick shield 136 to the backing plate 128. Moreover, the size of the head portion 208 relative to the aperture opening 192 and passageway 194 can constrain the movement of the pick shield 136 in a manner that can at least prevent the pick shield 136 from being linearly slid onto, or off of, the shield mount 158 at least in a direction that is generally parallel to the central longitudinal axis 142 of the pick shield 136. Additionally, the planar wall 180 of the pick shield 136 can be offset from the face wall 154 of the pick shield 136 such that when the pick shield 136 is secured to the backing plate 128 via the shield mount(s) 158, a back wall 212 of the head portion 208 abuts a portion of the first side 184 of the planar wall 180 of the arm portion 180.

While the head portion 208 in the illustrated embodiment is depicted as having a generally round cross-sectional shape, the head portion 208 can have a variety of other configurations that that can least assisting in constraining the pick shield 136 to a single degree of freedom relative to the attachment and detachment of the pick shield 136 to the backing plate 128, including the associated shield mounts 158. For example, according to certain embodiments, the head portion 208 of the shield mount 158 can provide at least one protrusion that extends to a length in a direction that is non-parallel to at least the central axis 202 of the shield mount 158 that prevents the aperture opening 192 or passageway 194 of the illustrated pick shield 136 from being slightingly displaced over at least the first end 204 of the shield mount 158. Such a protrusion can have a variety of shapes and configurations, including, but not limited to, a hook shape.

The shield mount 158 can also include a shoulder portion 210 positioned between the head portion 208 and a threaded portion 214 of the shield mount 158. The shoulder portion 210 can be sized to accommodate at least a portion of the shoulder portion 210 passing through the passageway 194 and being positioned in the aperture opening 192 of the aperture portion 170 of the attachment body 156. Further, according to certain embodiments, a portion of the shoulder portion 210 can be configured to sit within the pocket 200 of the attachment body 156 when the pick shield 136 is secured to the backing plate 128.

The illustrated shield mount 158 further includes the threaded portion 214, which can be configured to threadingly engage a mating threaded portion of the backing plate 128 and/or other portion or component of the trim portion 108. In the illustrated embodiment, the threaded portion 214 can be positioned between the shoulder portion 210 and the second end of the shield mount 158. Such a configuration can accommodate the shield mount 158 being selectively attached and detached from the backing plate 128 or other associated component of the trim portion 108. However, the shield mount 158 can have a variety of other configurations that do not include the threaded portion 214, including, for example, configurations in which the shield mount 158 is formed as a portion of the backing plate 128, including, for example, part of a monolithic structure with other portions, if not the entirety, of the backing plate 128. Thus, according to certain embodiments, of the shield mount(s) 158 may not be configured for selective detachment from the backing plate 128.

FIGS. 12A and 12B illustrate an example of the pick shield 136 being limited to a single degree of freedom when engaging the backing plate 128 and associated shield mounts 158 when the pick shield 136 is being securely attached and detached from at least the backing plate 128. Moreover, in the example provided by FIGS. 12A and 12B, when the pick shield 136 is to be secured to the backing plate 128, and the shield mounts 158 are, in this example, each secured in an associated mounting hole 198, the pick shield 136 can be positioned such that the hub 164 is received in the orifice 162 portion of the cavity 138. Moreover, according to the illustrated embodiment, the attachment bodies 156*a*, 156*b* can be angularly offset relative to the shield mounts 158 such that the shield mounts 158 do not contact the first side 184 of the planar wall 180 of the arm portion 168, thereby allowing the first end 144 or face wall 154 of the pick shield 136 to contact the back wall 166 or other portion of the backing plate 128 while at least a portion of the hub 164 is positioned in the orifice 162. The pick shield 136 can then be rotated from a detached position in the first rotational direction ($r_1$) relative to the backing plate 128 such that the shoulder portion 210 of the shield mount 158 passes through the inlet 196 and along the passageway 194 of the aperture portion 170 until the pick shield is rotated to an attached position, wherein the shoulder portion 210 is received in the aperture opening 192. Moreover, according to certain embodiments, the pick shield 136 can be rotated in the first rotational direction ($r_1$) until, at the attached position, the shoulder portion 210 contacts the slot walls 190*a*, 190*b* at a location at which the portion of the slot walls 190*a*, 190*b* that define the aperture opening 192 come together. Thus, with a portion of the shield mount 158, which is in this example is at least a portion of the shoulder portion 210, positioned in the aperture opening 192, the pick shield 136 can be at an attached positioned wherein the pick shield 136 is securely attached to at least the backing plate 128.

In the foregoing example, at the attached position, the shield mount 158 and backing plate 128 constrain movement of the pick shield 136 such displacement for the pick shield 136 from the attached position to a detached position is limited to the pick shield 136 being rotated in the second rotational direction that, again, is opposite to the first rotational direction. Moreover, as discussed above, the head portion 208, as well as the backing plate 128, are configured to provide constraints that prevent the pick shield 136 from being linearly displaced away from either the head portion 208 or the backing plate 128. Instead, detachment of the pick shield 136 is limited to the pick shield 136 being rotated relative to at least the backing plate 128 such that the shield mount 158 is removed from the aperture opening 192 and again passes through the passageway 194 before exiting from the aperture portion 170 through the inlet 196.

As demonstrated above, the illustrated pick shield 136 can be secured to at least the backing plate 128 without the pick shield 136 having to be retained in a position relative to the backing plate while the shield mounts 158 are being attached to the backing plate 128. Moreover, the pick shield 136 does not have to be retained in any position while a hand tool is used to secure the shield mount 158 or other mechanical fastener to the backing plate 128 or other portion of the trim portion 108. Instead, to the extent the shield mounts 158 are to be secured to the backing plate 128 or other portion of the trim portion 108 via use of a tool, such securing of the shield mount(s) 158 can occur independently of the time at which the pick shield 136 is secured to the backing plate 128. Such an approach can prevent damage to the trim portion 108 that can otherwise accompany attempts to maintain a position of the pick shield 136 while also positioning a shield mount 158 and operating a hand tool to simultaneously secure the shield mount 158 and pick shield 136 to backing plate 128 of other portions of the trim portion 108. Additionally, as discussed above, embodiments of the subject disclosure can also include the shield mount(s) 158 being integral, including for example, being part of a monolith structure, with the backing plate 128 or other portions of the trim portion 108, thereby eliminating any need to separately secure the shield mount 158, including via use of a tool. Such an approach can also prevent damage to the trim portion 108 that can otherwise accompany attempts to manipulate a hand tool to simultaneously secure the shield mounts 158 and pick shield 136 to the backing plate 128 or other portion of the trim portion 108.

FIGS. 13-17 illustrate another exemplary embodiment of a pick shield 300, and, more specifically, attachment bodies 302*a*, 302*b* (generally attachment body 302) for the pick shield 300. Moreover, the attachment bodies 302*a*, 302*b* for the illustrated pick shield 300 are again configured for the pick shield 300 to be limited to a single degree of freedom with respect to the movement of the pick shield 300 to detach the pick shield 300 from the backing plate 128, including the associated shield mounts 158 of the backing plate 128. However, while such a single degree of freedom for the pick shield 136 illustrated in at least FIG. 12B is rotational displacement, the single degree of freedom for the pick shield 300 shown in FIGS. 13-17 is linear displacement in a direction that is generally orthogonal to the central axis 202 of the shield mount 158 and/or the central longitudinal axis 142 of the pick shield 136. Moreover, according to certain embodiments, pick shield 300 can be constrained, with respect to being displaced from the attached position to a detached position, to a single degree of freedom that is parallel to a plane defined by at the second side 118 of the door 102.

Figure 15:
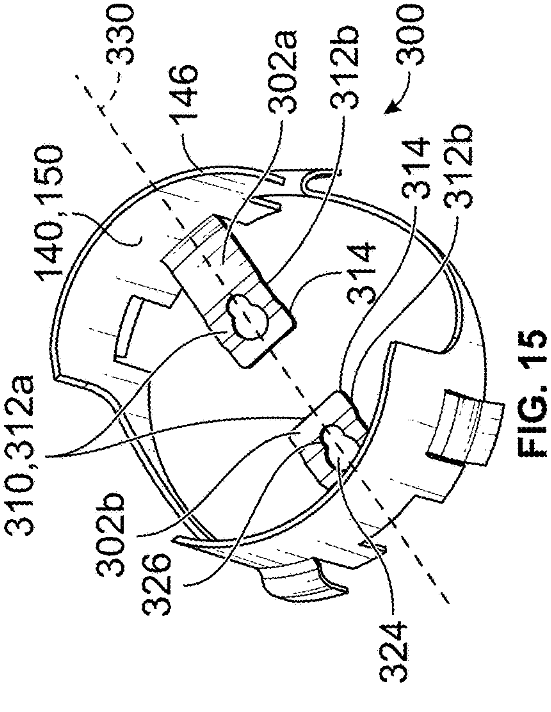
FIG. 15 illustrates a top side perspective view of the pick shield shown in FIG. 13.
Figure 16:
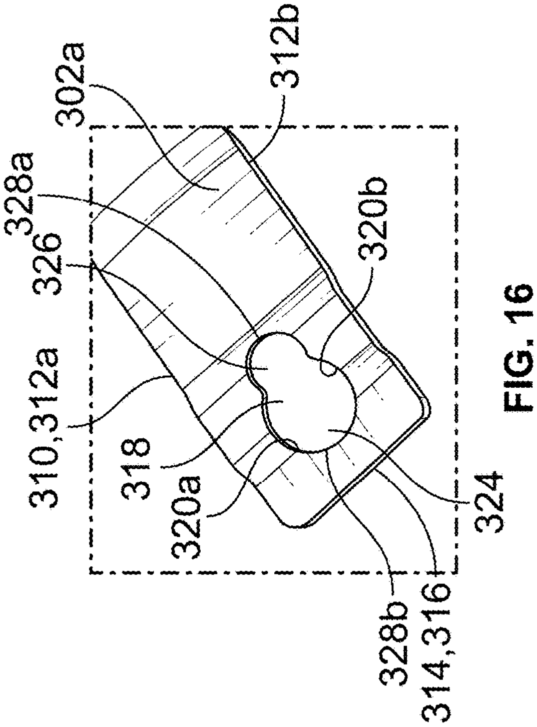
FIG. 16 illustrates a portion of an attachment body of the pick shield shown in FIG. 15.
Figure 17:
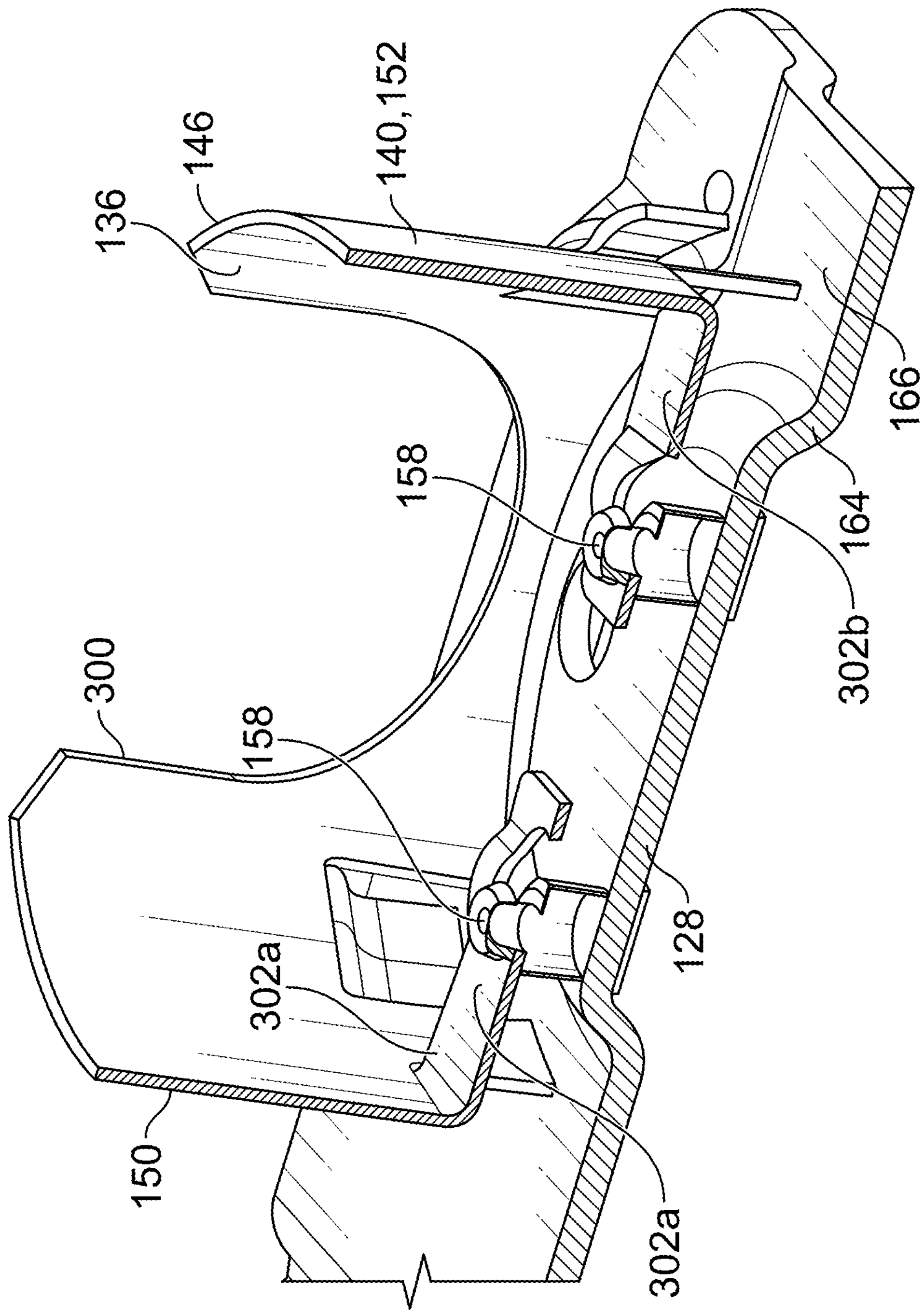
FIG. 17 illustrates a section view of the assembly shown in FIG. 13.

As seen in at least FIGS. 15 and 16, the arm portion 304 of the attachment bodies 302*a*, 302*b* can inwardly extend from an inner surface of the outer wall 140 or the transition wall 160. Further, the side wall 310 of the illustrated exemplary arm portion 304 can comprise opposing, and generally parallel first and second sidewalls 312*a*, 312*b* that generally terminate at a top wall 314 that can define an apex 316 of the arm portion 304, and which can generally extend between the first and second walls 312*a*, 312*b*. Thus, the arm portion 304 can have, for example, but is not limited to, a generally rectangular cross-sectional shape, among other shapes. Further, unlike the aperture portion 170 for the pick shield 136 shown in at least FIG. 5, the aperture portion 318 for the pick shield 300 shown in at least FIG. 16 does not extend through the side wall 310 of the arm portion 304. Thus, the slot walls 320*a*, 320*b* of the aperture portion 318 shown in at least FIG. 16 are joined, or otherwise connected at opposing first and second ends 322*a*, 322*b* of the aperture portion 318, and generally define a passageway 324 of the aperture portion 318. Thus, rather than having an inlet 196 through a side wall 174 of an arm portion 168, as shown above for the prior embodiment of the pick shield 136, the slot walls 320*a*, 320*b* can come together at an end of the passageway 324, as well as again in connection with defining the aperture portion 318.

In the embodiment shown in at least FIG. 16, the portion of the slot walls 320*a*, 320*b* that define the passageway 324 are separated by a distance that can accommodate passage of the head portion 208 of the shield mount 158 into and through the passageway 324. Moreover, the passageway 324 can be sized such that, with the passageway 324 vertically aligned with the head portion 208, the pick shield 300 can be linearly displaced in a first linear direction that is generally parallel to the central axis 202 of the shield mount 158 and/or the central longitudinal axis 142 of the pick shield 136 such that the head portion 208 can enter into, and through the passageway 324. In certain instances, the arm portion 304 can be offset from the face wall 154 such that, as the pick shield 300 is displaced in the first linear direction while the head portion 208 passes though the passageway 324, the stoppage of such displacement resulting from the face wall 154 or first end 144 of the pick shield 300 contacting the hub 164 or other portion of the backing plate 128 occurs when the at least a portion of the shoulder portion 210, and not the head portion 208, is positioned within the passageway 324. The pick shield 300 can then be lowered in a first vertical direction (as generally indicated by "$d_1$" in FIG. 14) relative to the backing plate 128, including the shield mounts 158, the first vertical direction ($d_1$) being generally orthogonal to the first linear direction such that shoulder portion 210 of the shield mount 158 is received in a corresponding aperture opening 326 of the aperture portion 318. Again, the aperture opening 326 can have a size, such as, for example, width, including diameter, that is smaller than a corresponding width of the head portion 208 so as to prevent the head portion 208 from entering, let alone pass through, the aperture opening 326. Further, according to the illustrated embodiment, the aperture opening 326 can be offset from the associated passageway 324 in the first vertical direction ($d_1$). Thus, as seen in at least FIG. 15, the aperture opening 326 for the aperture portion 318 for both attachment bodies 302*a*, 302*b* are in the same downstream position relative to the corresponding passageway 324. As seen in FIG. 15, such a configuration results in the aperture opening 326 for a first attachment body 302*a* being positioned between the corresponding passageway 324 and top wall 314, while, conversely, for the second attachment body 302*b*, the passageway 324 is positioned between the top wall 314 and the aperture opening 326 for that second attachment body 302*b*.

Further, as also seen in FIG. 15, according to certain embodiments, the aperture portion 318 for each of the first and second attachment bodies 302*a*, 302*b* can be aligned along the same, or a shared, central arm axis 330 that may be coaxial with the second linear direction. Similarly, each of the arm portion 304 of the two attachment bodies 302*a*, 302*b* of the pick shield 300 can also generally extend about, and share, the same central arm axis 330 as the aperture portions 318. However, according to other embodiments, the first and second attachment bodies 302*a*, 302*b* can each extend along a different central axis that is not shared with the other attachment body 302*a*, 302*b*.

With the shoulder portion 210, or other portion, of the shield mount 158 positioned within the aperture opening 326 of a corresponding attachment body 302*a*, 302*b*, movement of the pick shield 300 is again constrained to by at least the head portion 208, the backing plate 128, and the configuration of the aperture portion 318 to a single degree of movement. More specifically, when at the attached position, the pick shield 300 is limited to movement relative to the backing plate 128, including the associated shield mounts 158, in a second vertical direction (as generally indicated by "$d_2$" in FIG. 14) that is generally opposite to the first vertical direction ($d_1$). The attachment bodies 302*a*, 302*b* can also include features similar to those discussed above that can also assist in resisting movement of the pick shield 300 from the attached position, including, but not limited to, a pocket 200 around the aperture opening 326, a sloped ramp, and associated deflected and pre-deflected configurations of the arm portion 304.

Figure 18:
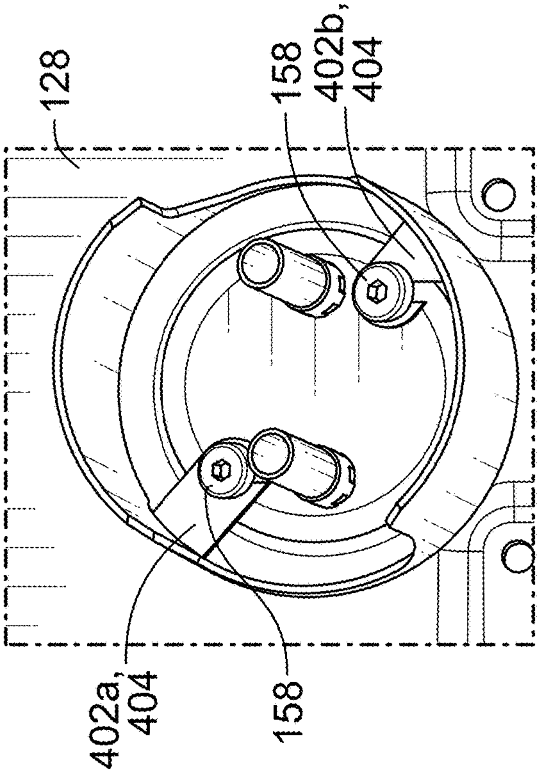
FIG. 18 illustrates a rear side perspective view of a portion of another assembly comprising a third embodiment of a pick shield securely affixed to a backing.
Figure 19:
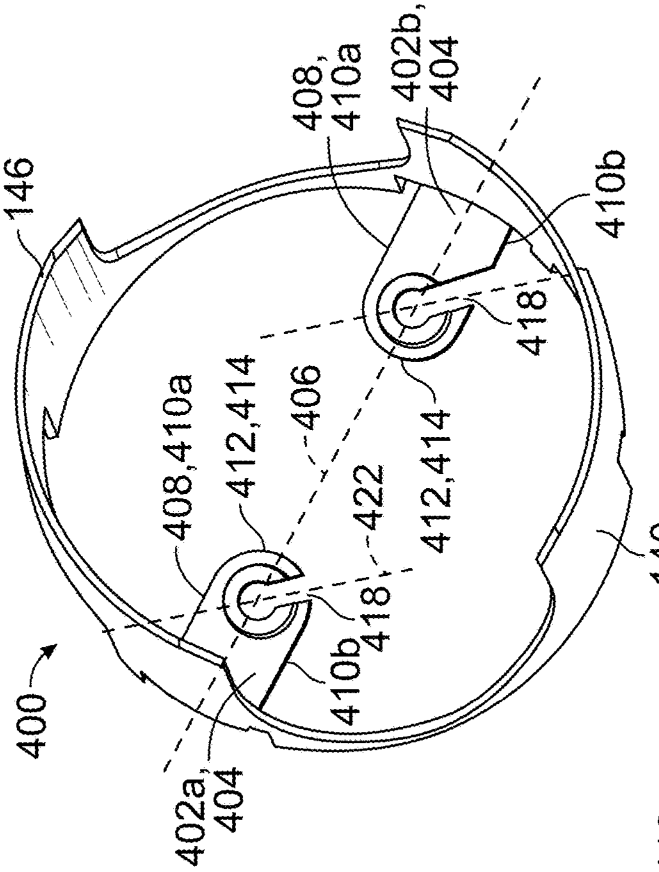
FIG. 19 illustrates a top side perspective view of the shield mount shown in FIG. 18.
Figure 20:
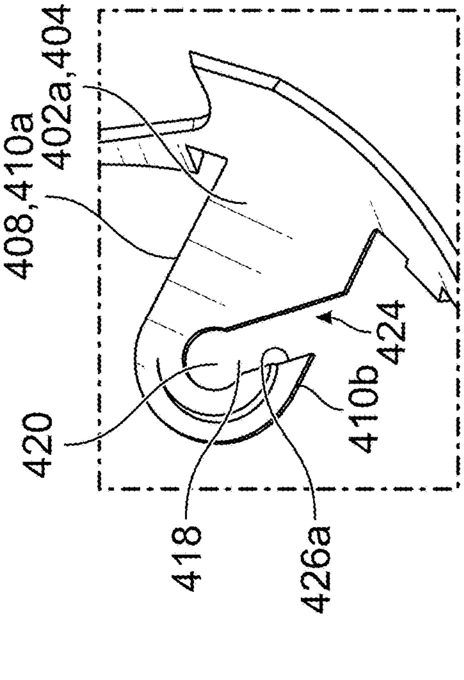
FIG. 20 illustrates a portion of an attachment body of the pick shield shown in FIG. 19.

FIGS. 18-20 illustrate another embodiment of a pick shield 400 that can be constrained to a single degree of freedom when in the attached position that is similar to the single degree of freedom of the pick shield 400 shown in FIGS. 13-17. Moreover, similar to the attachment bodies 302*a*, 302*b* of the pick shield 300 shown in FIGS. 13-17, the arm portion 404 of each of the attachment bodies 402*a*, 402*b* for the pick shield 400 shown in FIGS. 18-20 inwardly extend relative to at least the outer wall 140 in or around the cavity 138, or the orifice 162 portion of the cavity 138, along a shared central arm axis 406 that is similar to the central arm axis 330 discussed above with respect to the pick shield 300 shown in at least FIG. 15. Moreover, as seen at least FIG. 19, the arm portion 404 includes a sidewall 408 comprising opposing first and second sidewalls 410*a*, 410*b* that can be generally parallel to the central arm axis 406 of the arm portion 404, and which terminate at a top wall 412 that can generally provide, or extend to, an apex 414 of the arm portion 404.

The aperture portion 416, including, for example, the passageway 418 and associated aperture opening 420 for the pick shield 400 shown in at least FIG. 19, however, can extend along an aperture axis 422 that is non-parallel to the central arm axis 406. Further, optionally, the aperture axis 422 can also be non-perpendicular to the central arm axis 406 and/or one or both of the first and second sidewalls 410*a*, 410*b* of the sidewall 408 of the arm portion 404, as seen in at least FIG. 19. Additionally, for each attachment body 402*a*, 402*b*, the aperture portion 416 can include an inlet 424 to the passageway 418 that extends through one of the first and second sidewalls 410*a*, 410*b*. For example, the inlet 424 can extend through the second side wall 410*b* for both attachment bodies 402*a*, 402*b*.

As see in at least FIG. 20, the slot walls 426*a*, 426*b* that define both the passageway 418 and the aperture opening 420 can be joined at the aperture opening 420 such so as to provide the aperture opening 420 with a generally rounded shape. Moreover, the portion of the slot walls 426*a*, 426*b* that define the aperture opening 420 can be configured to abut, when the pick shield 400 is secured to the backing plate 128, at least the shoulder portion 210 of the shield mount 158 that is received in the aperture portion 416.

During installation, the pick shield 400 can be positioned vertically above, and horizontally aligned with, the shoulder portion 210 of the shield mount 158. The pick shield 400 can then be linearly displaced in the first vertical direction ($d_1$) (FIG. 14) such that the shoulder portion 210 can pass through the passageway 418 until being positioned within the aperture opening 420, thereby securing the pick shield 400 to at least the backing plate 128. Further, such a configuration prohibits subsequent movement of the pick shield relative to the backing plate and all come about 1:00, direction, moreover, if they pick shield is to be subsequently removed, or detached, from the backing plate, the pick shield is confined to being displaced in the above-discussed second vertical direction ($d_2$) (FIG. 14), which, as discussed above, is opposite to the first vertical direction at which the pitch shield was displaced when being secured to the backing plate 128.

Figure 21:
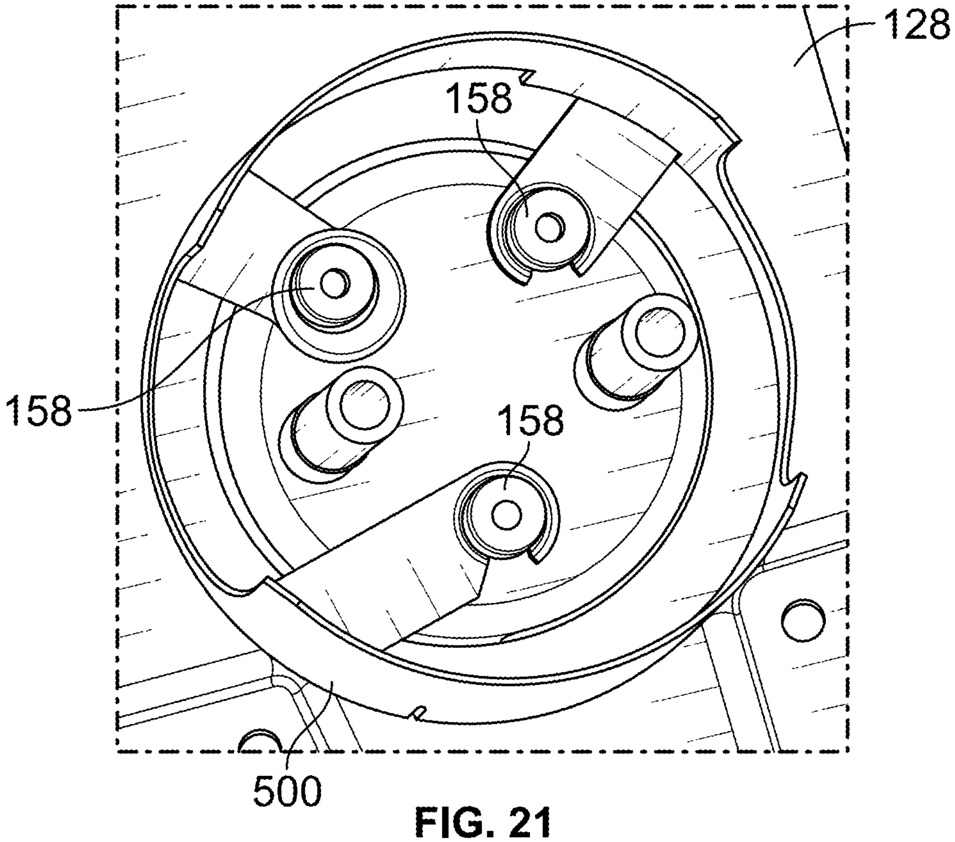
FIG. 21 illustrates a rear side perspective view of a portion of another assembly comprising a fourth embodiment of a pick shield securely assembled to a backing plate.
Figure 22A:
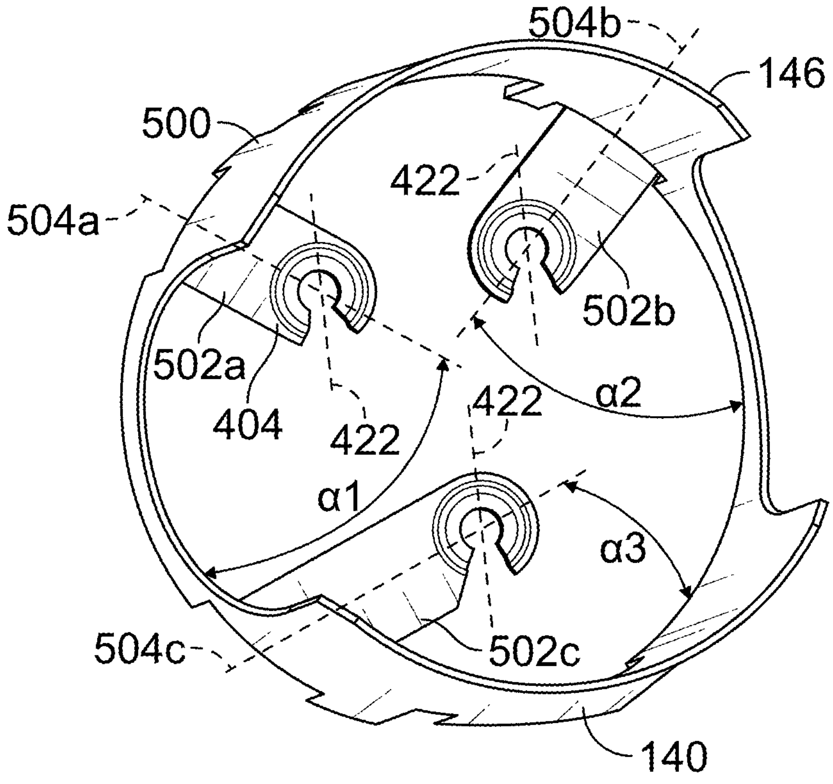
FIG. 22A illustrates a top side perspective view of the shield mount shown in FIG. 21.
Figure 22B:
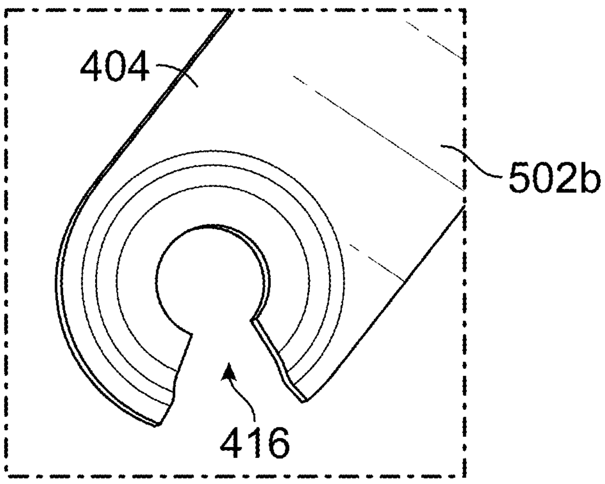
FIG. 22B illustrates a portion of an attachment body of the pick shield shown in FIG. 22A.

FIGS. 21-22B illustrate another embodiment of a pick shield 500 that can be constrained to a single degree or movement when in the attached position that is similar to the single degree of freedom of the pick shield 400 shown in FIGS. 18-20. Moreover, the pick shield 500 shown in at least FIG. 22A can be slidingly secured or affixed to the backing plate 128, as well as be restrained to a single degree of freedom, in a manner that is generally similar to that discussed above with respect to the pick shield 400 shown in at least FIG. 19. Thus, the pick shield 500 can include attachment bodies 502*a*, 502*b*, 502*c* having an arm portion 404 and aperture portion 416 that is similar to the attachment bodies 402*a*, 402*b* discussed above with respect to the pick shield 400 shown in at least FIG. 19.

Unlike the pick shield 400 shown in at least FIG. 19, the pick shield 500 shown in FIGS. 21-22B has more than two attachment bodies 402*a*, 402*b*, and, more specifically, has three attachment bodies 502*a*, 502*b*, 502*c*. Additionally, unlike the attachment bodies 402*a*, 402*b* of the pick shield 400 shown in at least FIG. 19 that are each aligned, and extend toward each other, along a central, or shared, arm axis 406, the arm portion 404 for each of the attachment bodies 502*a*, 502*b*, 502*c* inwardly extend into the corresponding cavity 138, or orifice 162 portion of the cavity 138, along different arm axes 504*a*, 504*b*, 504*c*, each arm axis 504*a*, 504*b*, 504*c* being non-parallel and non-perpendicular to the other arm axis 504*a*, 504*b*, 504*c*. Further, the angular orientation at which at least one of the attachment body 502*a*, 502*b*, 502*c* inwardly extends into the cavity 138, including the orifice 162, can be different than the corresponding angle for at least one other attachment body 502*a*, 502*b*, 502*c*. For example, as shown in at least FIG. 22A, an angle (as generally indicated in FIG. 22A by "$\alpha_1$", "$\alpha_2$", "$\alpha_3$") between the inner side of outer wall 140 and the arm axis 504*a*, 504*b*, 504*c* for at least one attachment body 502*a*, 502*b*, 502*c* can be different than the corresponding angle ($\alpha_1$, $\alpha_2$, $\alpha_3$) for at least one other attachment body 502*a*, 502*b*, 502*c*.

The length of the arm portion 404 for one or more of the attachment bodies 502*a*, 502*b*, 502*c* of the pick shield 500 in a direction along the associated arm axis 504*a*, 504*b*, 504*c* for can be different than corresponding length along the associated arm axis 504*a*, 504*b*, 504*c* for another one, if not all other, attachment body(ies) 502*a*, 502*b*, 502*c*. Thus, for example, as seen in FIG. 22A, a third attachment body 502*c* can have a different length in a direction along the corresponding arm axis 504*c* than the other two attachment bodies 502*a*, 502*b*. The particular configuration, including but not limited to the above-discussed angular orientation and length of the attachment bodies 502*a*, 502*b*, 502*c*, and corresponding positioning of the aperture portion 416 of the attachment bodies 502*a*, 502*b*, 502*c*, can also be configured to accommodate the location of the mounting holes 198 in the backing plate 128 that are to receive the shield mounts 158, or vice versa.

Similar to the pick shield 300 shown in at least FIG. 15, FIGS. 23-25 illustrate another embodiment of a pick shield 600 in which an aperture portion 604 does not extend through the sidewall 608 of the arm portion 606 of the attachment bodies 602*a*, 602*b*. Further, as seen in at least FIG. 25, the attachment bodies 602*a*, 602*b* can extend from the transition wall 160 or inner surface of the outer wall 140 and into the cavity 138 toward each other, with the opposing first and second sidewalls 610*a*, 610*b* of the sidewall 608 extending in converging directions toward the apex 612 of the arm portion 606.

Figure 24:
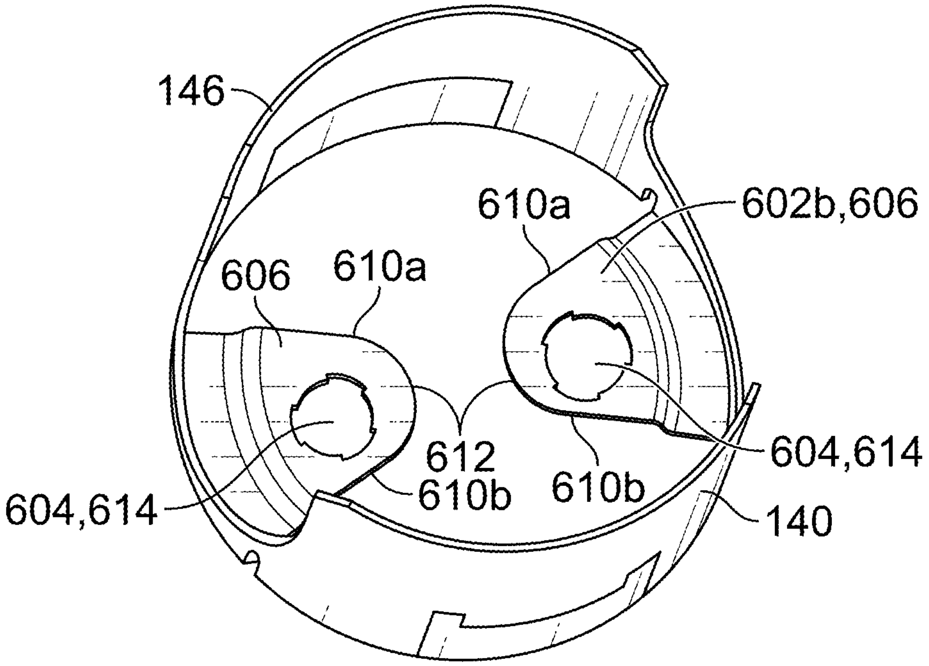
FIG. 24 illustrates a top side perspective view of the shield mount shown in FIG. 23.
Figure 25:
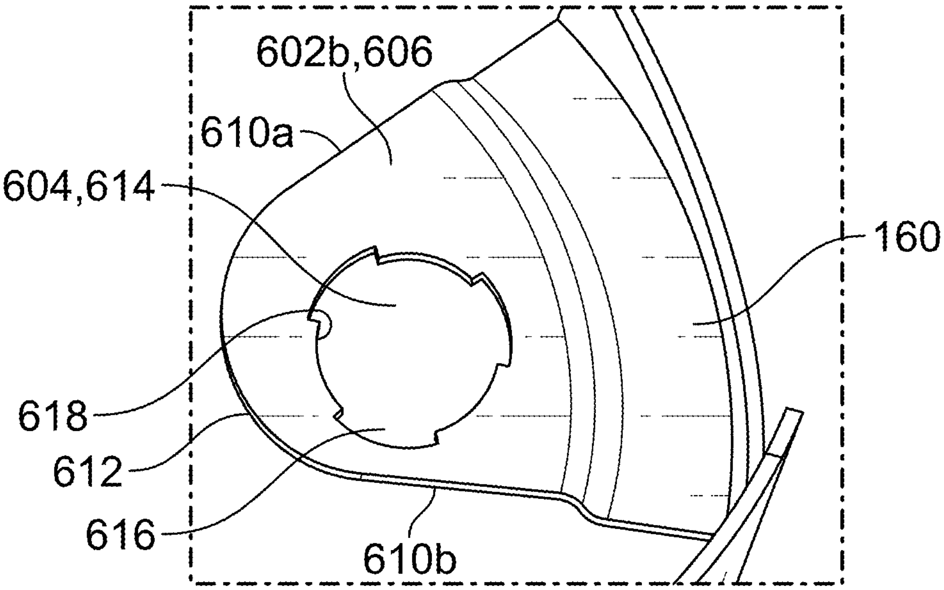
FIG. 25 illustrates a portion of an attachment body of the pick shield shown in FIG. 24.

Unlike the aperture portion 604 of the pick shield 300 shown in FIG. 15, the aperture portion 604 of the pick shield 600 shown in at least FIG. 24 does not include a passageway 324. Instead, the aperture portion 604 is configured for the aperture opening 614 to be receive, and be slide along, shield mount in the form of a mounting post 135 as the pick shield 600 is linearly displaced into a position at which the pick shield 600 abuts the backing plate 128, or associated gasket 132. Thus, the aperture portion 604 of the pick shield 600 is configured to restrict the pick shield 600 to a single degree of freedom, and, moreover, limit movement of the pick shield 600 relative to at least the backing plate 128 in a direction that is generally parallel to the central longitudinal axis 142 of the pick shield 600 and/or a central axis 137 of the mounting post(s) 135. According to the illustrated embodiment, the slot wall(s) 616 that generally define the aperture opening 614 can further include a plurality of protrusions 618 that can, when the pick shield 600 is secured on a mounting post 135, provide an interference that prevents movement of the pick shield 600, relative to the mounting post 135 and/or backing plate 128, in directions beyond the above-described single degree of freedom. Such protrusions 618 can be spaced along the slot wall(s) 616 away from other protrusions 618. Further, the protrusions 618 can also be sized relative at least to the size of the portion of the mounting post 135 that is to be positioned within the aperture opening 614 when the pick shield 600 is secured to the mounting post 135, so as to provide a resistive or pressing force against the mounting post 135 that can assist in maintaining a position of the pick shield 600 relative to the mounting post 135. Such resistive force can also be aided, for example, by the protrusions 618 having a wall thickness that can accommodate a degree of bending or deflection of the protrusions 618 that can enhance a compressive force exerted by the protrusions 618 against the mounting post 135. Additionally, according to certain embodiments, retention of the position of the pick shield 600 can further be supplemented via placement of one or more retention washers on the mounting post and against a backside of the arm portion 606 such that the arm portion 606 is between at least the retention washer and the backing plate 128 and/or gasket 132.

Figure 26:
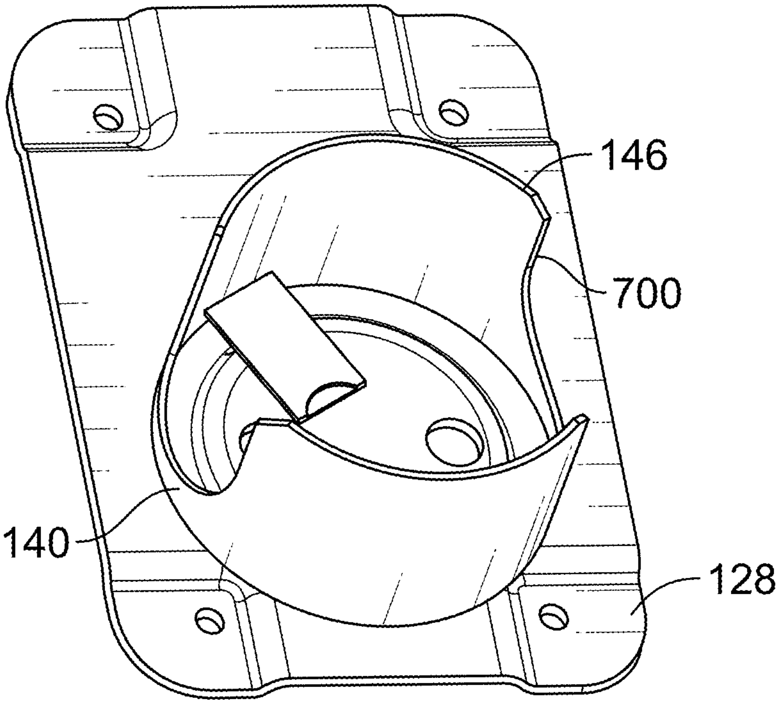
FIG. 26 illustrates a rear side perspective view of another assembly comprising a sixth embodiment of a pick shield securely assembled to a backing plate without the use of a shield mount.
Figure 27:
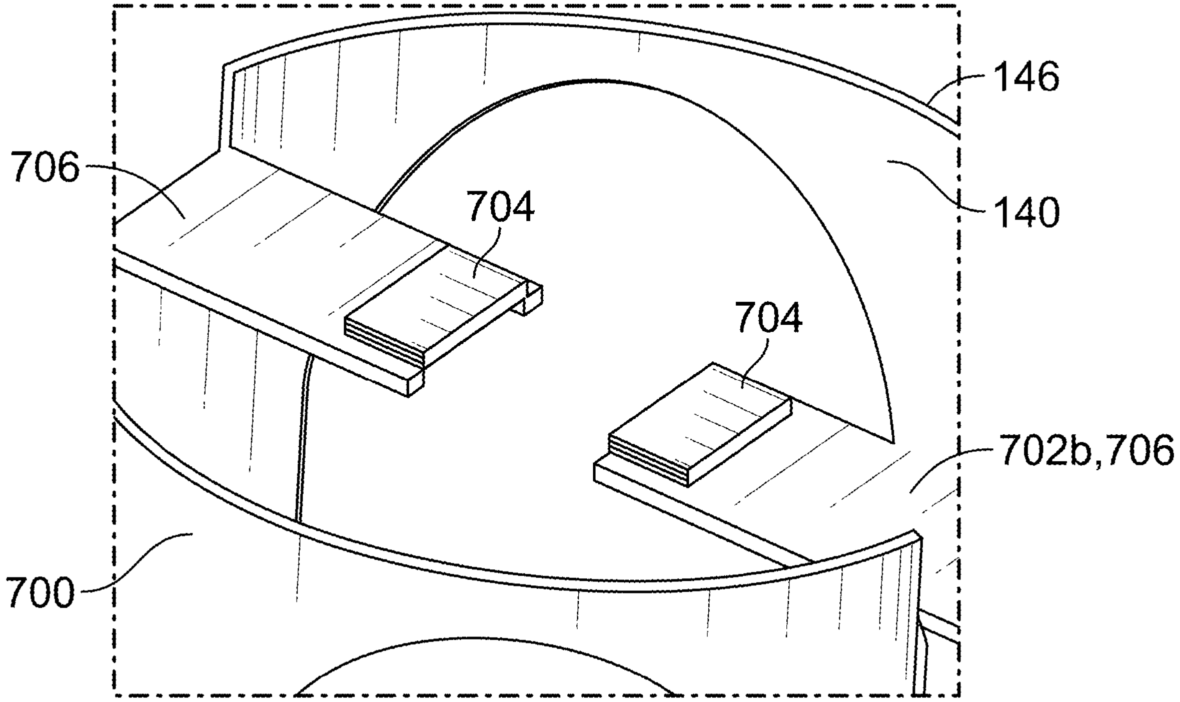
FIG. 27 illustrates a top side perspective view of a portion of the shield mount shown in FIG. 26.
Figure 28:
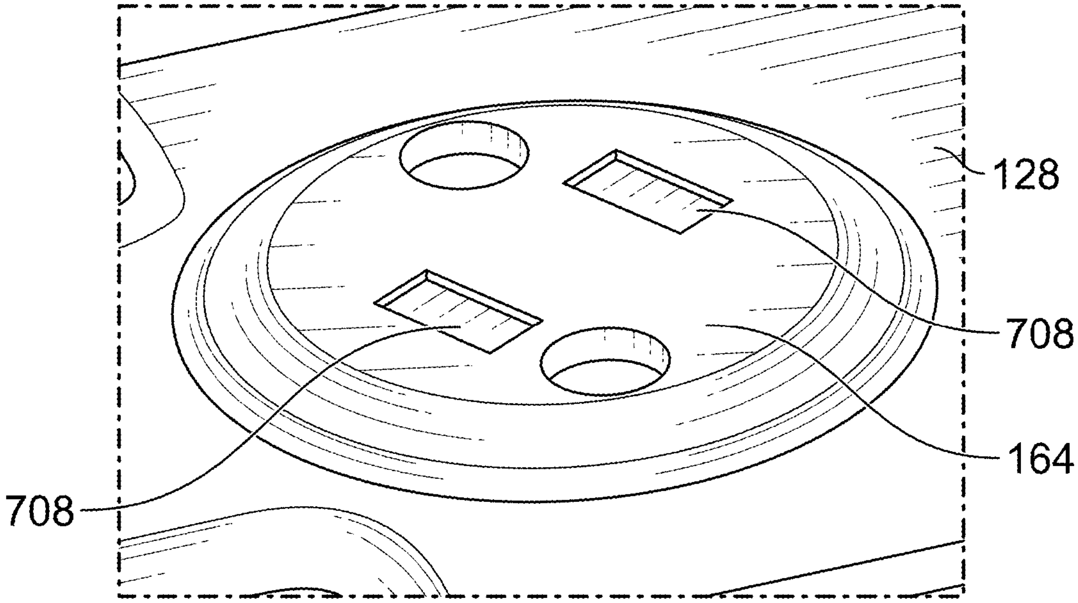
FIG. 28 illustrates a rear view of the backing plate shown in FIG. 26.

FIGS. 26-28 illustrate another embodiment of a pick shield 700 in which rather than having an aperture portion, the attachment bodies 702*a*, 702*b* each have a protrusion portion 704 that outwardly projects away from the arm portion 706 of the attachment body 702*a*, 702*b*. Thus, as with other embodiments, the arm portion 706 for each attachment body 702*a*, 702*b* can inwardly extend into the cavity 138 of the pick shield 700. The protrusion portion 704 can be located at a variety of locations about the arm portion 706, including, for example, and an end of the arm portion 706, including, for example, at or around the apex 188, 316, 414, 612 or top wall 314, 412 of the arm portion 706. Further, the protrusion portion 704 can extend from the arm portion 706 in a direction generally toward the first end 144 of the pick shield 700. The protrusion portion 704 can also have a variety of shapes and configurations that are sized to matingly engage a corresponding slot or opening 708 in the backing plate 128. Moreover, the protrusion portion 704 can have a size, among other geometric features, that can accommodate a snap or press fit of the protrusion portion 704 into the mating opening 708 of the backing plate 128 in a manner that can securely retain the pick shield 700 in engagement with the backing plate 128.

While various features may be discussed herein with respect to particular embodiments of pick shields 136, 300, 400, 500, 600, 700, such features can also be used with, or in combination with the, the features of one or more other pick shields 136, 300, 400, 500, 600, 700. Thus, while certain features may be discussed with respect to particular attachment bodies 156, 302, 402, 502, 602, 702, among other features discussed with respect to FIGS. 1-28, such features are not necessarily exclusive to a particular attachment body 156, 302, 402, 502, 602, 702, and may be used or combined with the features of one or more other attachment bodies 156, 302, 402, 502, 602, 702.

Figure 29:
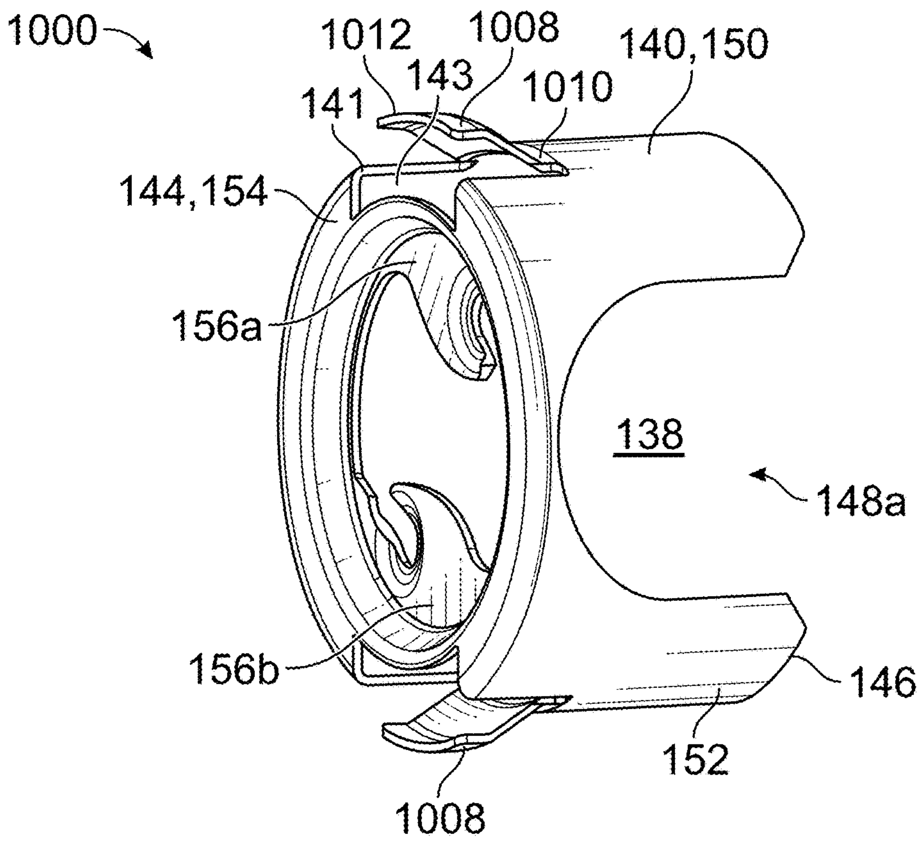
FIGS. 29 and 30 illustrate first and front side perspective views, respectively, of another embodiment of a pick shield.
Figure 30:
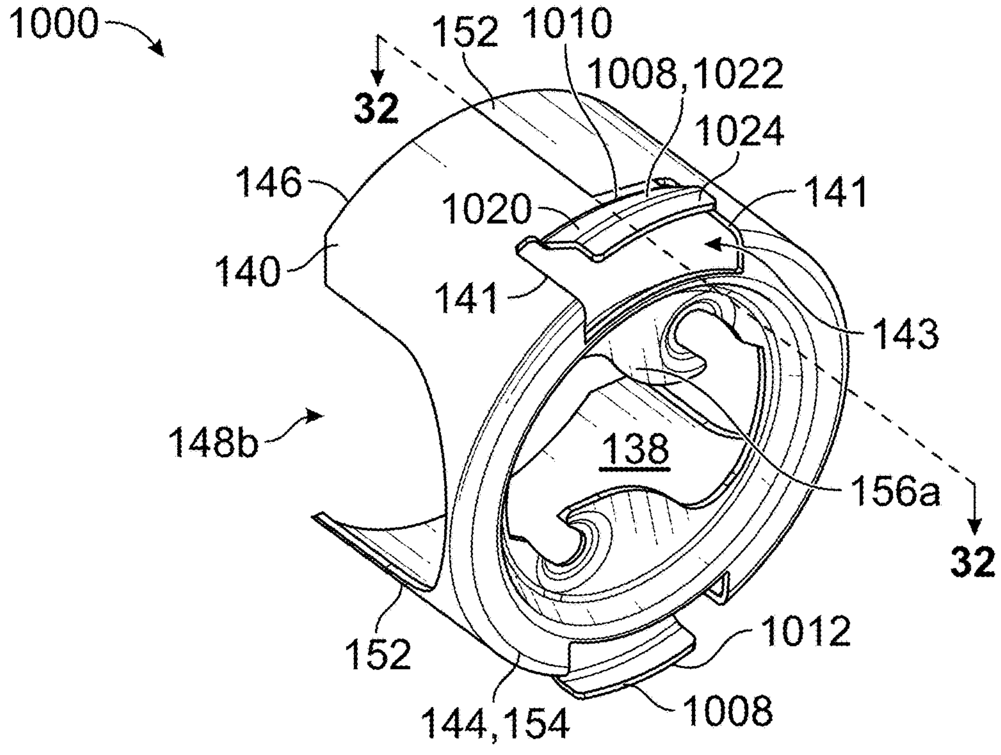
Figure 32:
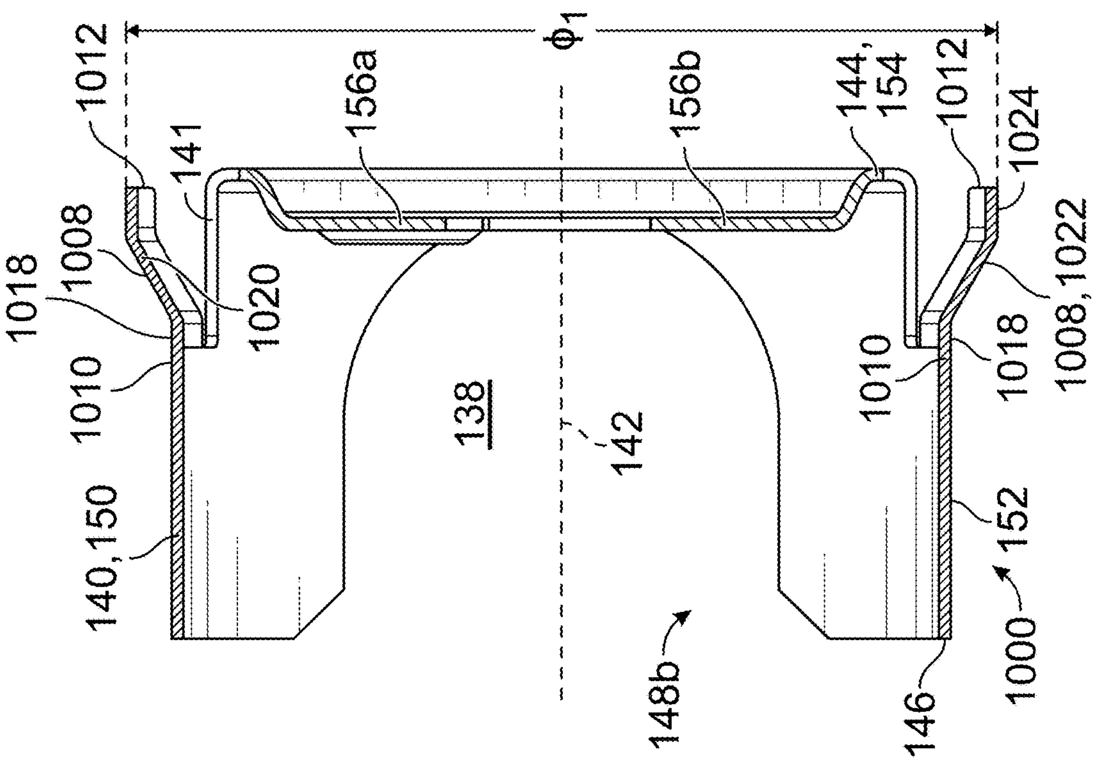
FIG. 32 illustrates a cross-sectional view of a pick shield taken along line A-A in FIG. 30.
Figure 31:
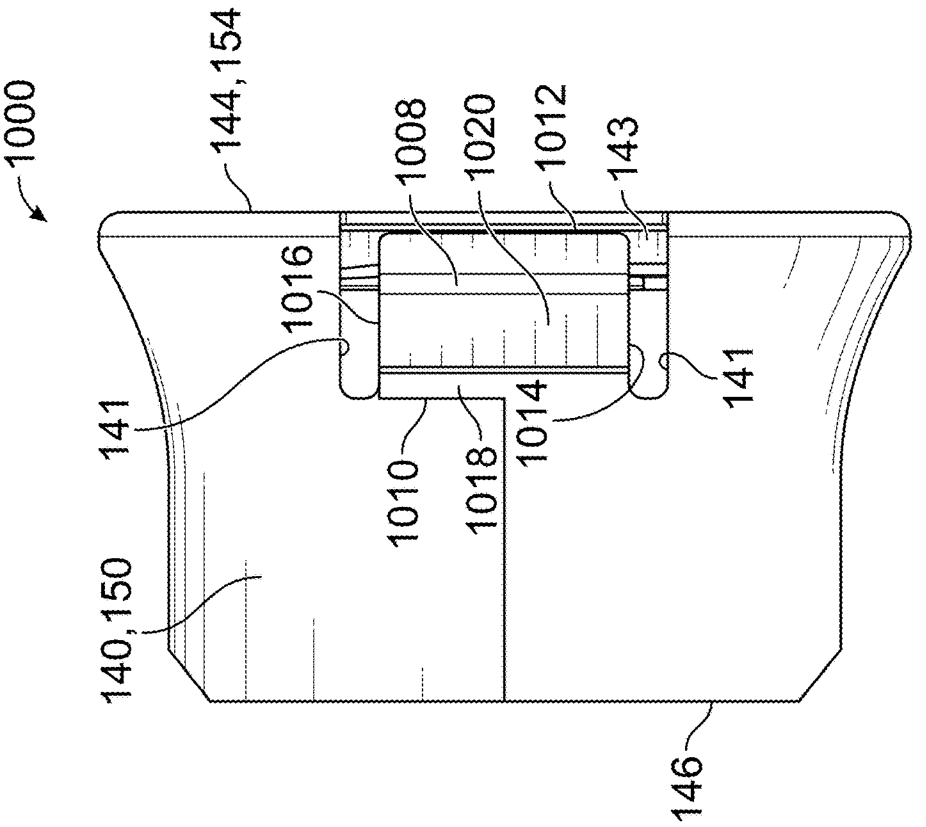
FIG. 31 illustrates a top side view of the pick shield shown in at least FIG. 29.

FIGS. 29 and 30 illustrate a first side perspective view and a side front perspective view, respectively, of another embodiment of a pick shield 1000. While the pick shield 1000 shown in FIGS. 29 and 30, as well as in FIGS. 31 and 32, is generally similar to the pick shield 136 discussed above, the illustrated pick shield 1000 further includes at least one, if not a plurality, of interference tabs 1008. The interference tabs 1008 are configured to securely engage with a wall(s) 123 (FIG. 36) within a portion of the door 102 that defines the cross bore 122, among other forms of door preparations, in a manner that can at least assist in retaining a position of the pick shield 1000 within the cross bore 122. Moreover, the interference tabs 1008 can be configured, including sized and positioned, to, when the pick shield 1000 is the cross bore 122, provide an interference or snap fit between the pick shield 1000 and the inner wall(s) 123 of the cross bore 122.

For example, according to certain embodiments, at least a portion of each interference tab 1008 can be arranged along, or to otherwise extend to, an interference size, including, for example, an interference diameter (as generally indicated by "$\phi_1$" in FIG. 32) or width that is larger than a corresponding size, such as, for example, diameter, of the cross bore 122. Accordingly, upon insertion of the pick shield 1000 into the cross bore 122, the size difference between the one or more walls 123 within the door 102 that define the cross bore 122 and the extent the interference tabs 1008 outwardly extend from the outer wall 140, among other portions of the pick shield 1000, can facilitate a generally inwardly displacement, including, a compression, bending, deflection, or deformation of at least a portion of the interference tabs 1008. Such engagement can facilitate a compressive or interference fit between the pick shield 1000 and the wall(s) 123 of the door 102 that can provide a force that resists movement of the pick shield 1000 within the cross bore 102, including movement in either or both a linear and rotational direction about the cross bore 122. Further, according to certain embodiments, the extent of the compressive force, as well configuration of the interference tabs 1008 and composition or material of the door 102 can also facilitate the interference tab 1008 compressing or pressing into the adjacent material of the door 1002 such that an outer portion of the interference tabs 1008 can at least partially sink or be implanted into an adjacent portion of the door 1002 in a manner that can assist in anchoring the position of the pick shield 1000 within the cross bore 122.

Referencing the interference tabs 1008 shown in FIGS. 29-32, one or more of the interference tabs 1008 can extend between a first end 1010 and a second end 1012 of the interference tab 1008, and include first and second sidewalls 1014, 1016. At least a portion of the first and second side walls 1014, 1016, as well as the second end 1012 of the interference tab 1008, can be detached from other portions of the pick shield 1000, including, for example, the outer wall 140 so as to accommodate an inward displacement, including, for example, a deformation, deflection, bending, or compression of the interference tab 1008 relative to other portions of the pick shield 1000 at least in response to an engagement with one or more walls 123 of the door 102 that define the cross bore 122, as discussed above. Additionally, as seen in at least FIG. 30, the outer wall 140 can include one or more slot walls 141 that can extend around, and/or beneath, at least a portion of the interference tab 1008 that can define a corresponding slot or groove 143 in the outer wall 140. The slot walls 141 and or the corresponding slot or groove 143 can be configured to separate the outer wall 140 from at least a portion of the interference tab 1008, which can assist in the ability of the interference tab 1008 to at least be inwardly displaced via the engagement with the one or more inner walls 123 of the door 102. Additionally, or alternatively, the slot or groove 143 can be configured to receive placement of at least a portion of the interference tab

1008 when the interference tab 1008 is inwardly displaced via the engagement of the interference tab 1008 with the wall(s) 123 of the cross bore 122.

Further, the interference tabs 1008 can include a hinge portion 1018 and a leg portion 1020, the hinge portion 1018 being positioned at the first end 1010 of the interference tab 1008 and coupled to the outer wall 140. According to certain embodiments, the hinge portion 1018 can be coupled to the outer wall 140 in a manner that can accommodate the inwardly displacement, including, for example, the deformation, deflection, or bending, of at least the leg portion 1020 of the interference tab 1008. Thus, the hinge portion 1018 can be configured to provide a pivot point, bending point, or other location for the generally inward displacement or compression of the interference tab 1008 relative to at least the adjacent portion of the outer wall 140. While the material thickness along the interference tab 1008 can be generally similar to that of the outer wall 140, optionally, according to certain embodiments, to assist with the inward displacement of the interference tab 1008 at the hinge portion 1018, the material thickness at the hinge portion 1018 may be less than that of the outer wall 140 and/or the leg portion 1020. Additionally, as seen in at least FIG. 32, according to certain embodiments at least a portion, if not the entirety, of the hinge portion 1018 can be generally coplanar with adjacent portions of the outer wall 140 and/or longitudinally extend in a direction that is generally parallel to the central longitudinal axis 142.

The leg portion 1020 can be positioned between the hinge portion 1018 and the second end 1012 of the interference tab 1008. According to certain embodiments, the leg portion 1020 can have a first portion 1022 and a second portion 1024, the first portion 1022 extending generally from the hinge portion 1018 to the second portion 1024, and the second portion 1024 extending to the second end 1012 of the interference tab 1008. In the illustrated embodiment, the first portion 1022 extends in a longitudinal direction that is both non-parallel and non-perpendicular to the central longitudinal axis 142 of the pick shield 1000, as seen, for example, in FIG. 32. Moreover, the first portion 1022 can be upwardly sloped, inclined, or curved between the hinge portion 1018 and the second portion 1024 in a direction toward the first end 144 of the pick shield 1000 a manner that can generally increase an overall size pick shield 1000 so as to provide the pick shield 1000 with the interference size, as discussed above. For example, given at least the upwardly and/or outwardly incline of the first portion 1022, the second portion 1024 of each of the plurality of the interference tabs 1008 can be aligned along an interference diameter that is larger than a corresponding diameter of the outer wall 140 or shields 150 of the interference shield 1008, and thus can increase the overall size, including diameter or width, of the pick shield 1000. Again, as discussed herein, such an increase in size provided by the interference tabs 1008 can create an interference between the pick shield 1000 and adjacent wall(s) 123 of the cross bore 122, or other cutout, in a manner than can at least assist in retaining a linear and/or angular position of the pick shield 1000 within the cross bore 122.

According to certain embodiments, the second portion 1024 can extend from the first portion 1022 in a longitudinal direction that is generally parallel to the central longitudinal axis 142, as also shown, for example, in at least FIG. 32. Moreover, according to certain embodiments, the second portion 1022 is configured to extend longitudinally in a direction that is generally parallel to the adjacent wall(s) 123 of the door 102 that define the cross bore 122. Further, the second portion 1022 for each of a plurality of interference tabs 1008 can be vertically offset from at least the adjacent portions of the outer wall 140 such that as the pick shield 1000 is inserted into the cross bore 122, the second portions 1024 of the leg portions 1020 of the interference tabs 108 each engage the wall(s) 123 of the cross bore 123 in a manner that forces the generally inward displacement of at least a portion of the interference tabs 1008 so as to provide the press or interference fit between the between the pick shield 1000 and the inner wall(s) 123 that can assist in retaining a position of the pick shield 1000, as discussed above.

Figure 33:
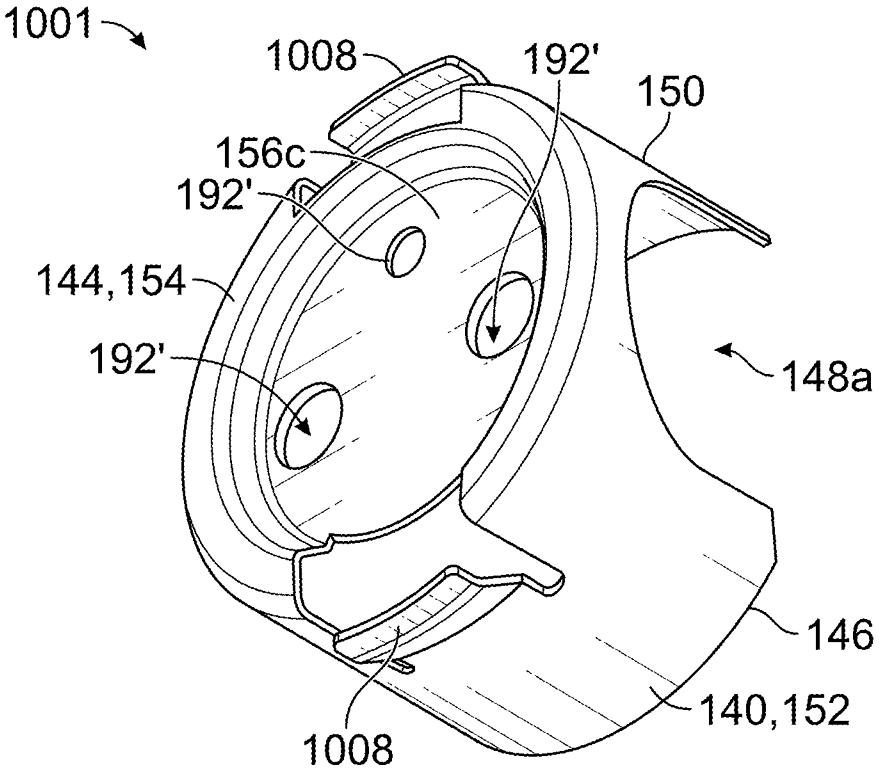
FIG. 33 illustrates a perspective view of another embodiment of a pick shield.

FIG. 33 illustrates another embodiment of a pick shield 1001 that is generally similar to the pick shield 1000 depicted in FIGS. 29-32. However, the illustrated pick shield 1001 includes an attachment body **156*c* having apertures 192' used in connection with securing the pick shield 1001 to the trim portion 108 and/or backing plate 128, and which is different than the attachment bodies 156*a*, 156*b* for the pick shields 136, 1000 shown in at least FIGS. 5 and 29. However, as generally indicated by at least FIGS. 5, 29, and 33**, the various types of interference tabs discussed throughout this disclosure can be used with a variety of the different pick shield embodiments discussed herein.

Figure 23:
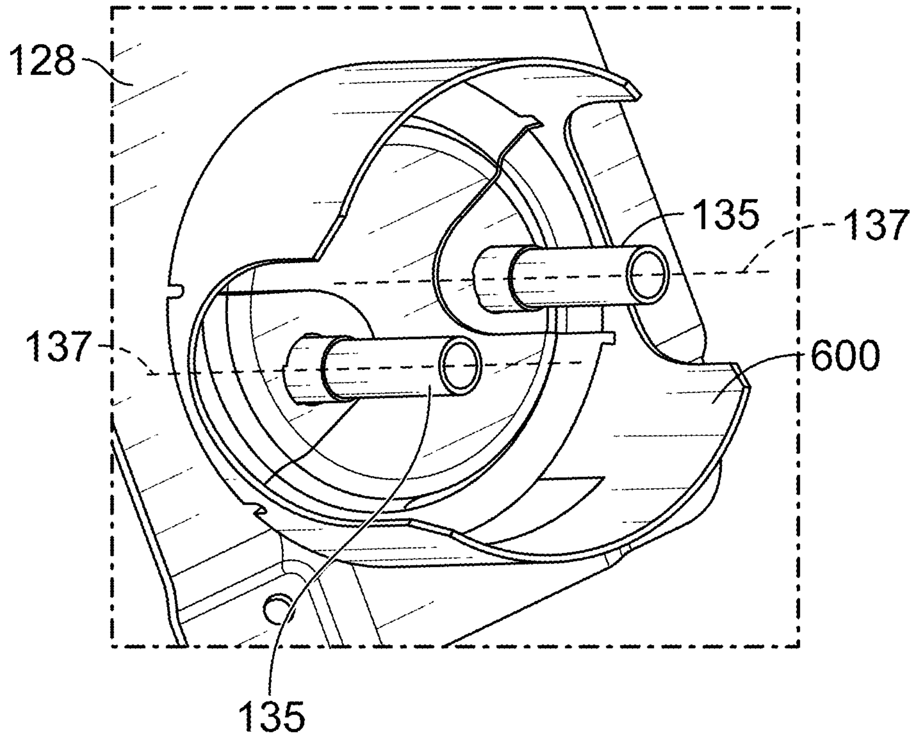
FIG. 23 illustrates a rear side perspective view of a portion of another assembly comprising a fifth embodiment of a pick shield securely assembled to a backing plate.
Figure 34:
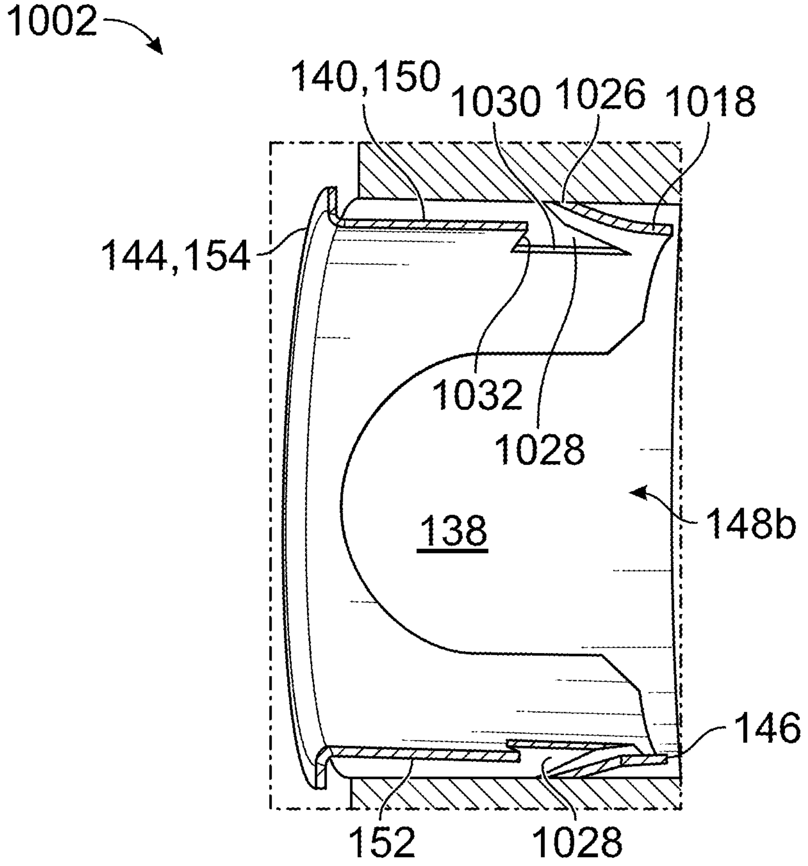
FIG. 34 illustrates a cross-sectional view of an additional embodiment of a pick shield.

FIGS. 29-23 illustrate an exemplary embodiment in which the second end 1012 of the interference tab 1008 extends generally to the first end 144 of the pick shield 1000. Thus, as seen in at least FIG. 32, the second end 1012 of the interference tab 1008 can, extend through the first end 144 of the pick shield 1000 and/or the face wall 154, thereby providing an opening around a portion of the outer portion or diameter of the face wall 154, while also extending in a lateral direction toward the second end 146 of the pick shield 1000. Thus, according to such an embodiment, the interference tabs 1008 can be positioned generally around the first end 144 of the pick shield 1000. However, interference tabs can be positioned at a variety of other locations, as well as a combination of different locations, about the pick shield 1000. For example, FIG. 34 illustrates another embodiment of a pick shield 1002 having a plurality of interference tabs 1026 that are upwardly inclined, sloped, or curved in a direction generally toward the first end 144 of the pick shield 1000, but which are positioned adjacent to the second end 146 of the pick shield 1002. According to such an illustrated embodiment, the hinge portion 1018 can be generally adjacent to, if not provided by, the second end 146 of the pick shield 1002. Further, unlike the slot or groove 143 shown in FIGS. 29-33, the slot or groove 1028 of the pick shield 1002 shown in FIG. 34 does not extend through the first end 144. Instead, the perimeter of the slot or groove 1028 is partially defined by a pair of opposing longitudinal walls 1030, with one of the longitudinal walls 1030 extending along the hinge 1018, while the perimeter of the slot or groove 1028 further includes a pair of opposing lateral walls 1032.

Figure 36:
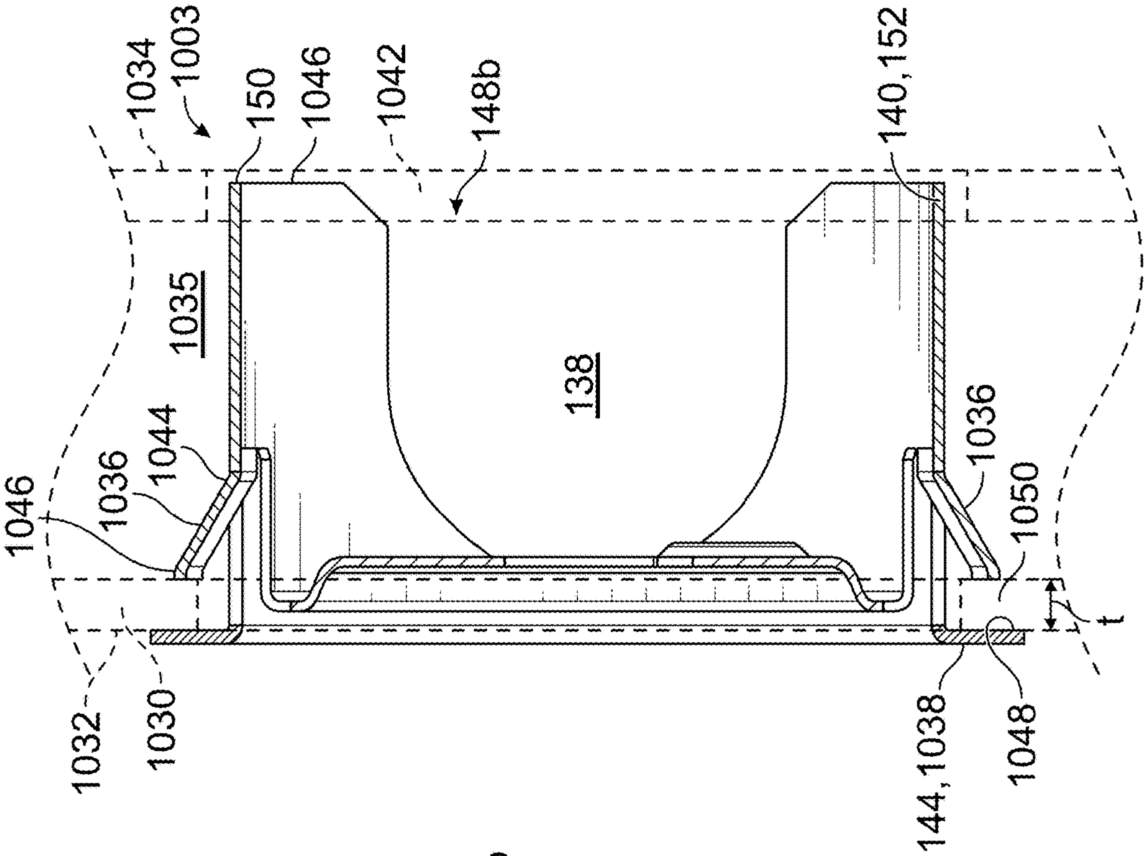
FIG. 36 illustrates a cross-sectional view of a pick shield taken along line A-A in FIG. 35.
Figure 35:
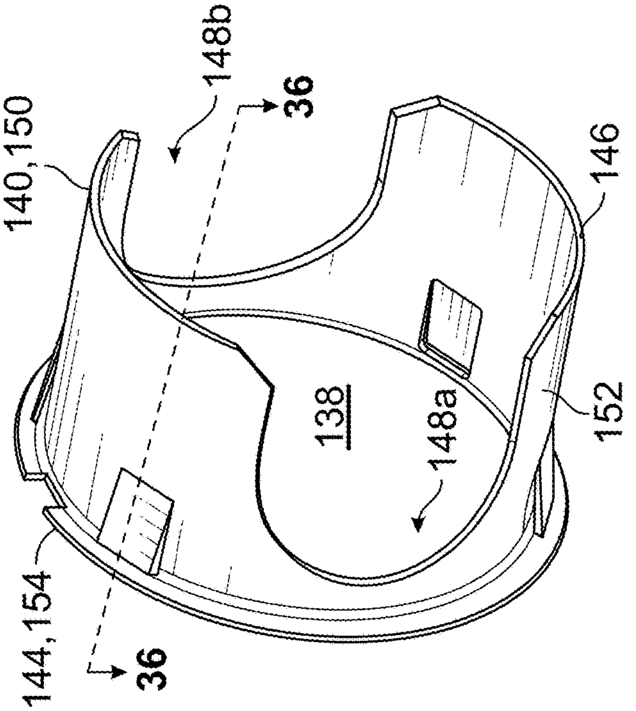
FIG. 35 illustrates a rear side perspective view of another embodiment of a pick shield.

FIGS. 35 and 36 illustrates another embodiment of a pick shield 1003 that can be used with solid or hollow doors. For example, FIG. 36 illustrates a hollow door 1030 in which a first, interior wall 1030 and a second, exterior wall 1032 of the door 1030 are separated by a hollow space 1035 which may, or may not, include insulative materials or other filler material. The illustrated pick shield 1003 can include a plurality of interference tabs 1036 that are generally similar to at least the interference tabs 1036 of the pick shields 1000, 1001 discussed above with respect to FIGS. 29-33. Thus, with respect to doors that are not hollow, the interference tabs 1036 can be configured to outwardly extend from the pick shield 1003 to exert a force against, if not indent, the adjacent wall(s) 123 of the cross bore 122. The pick shield 1003 further includes a face flange 1038 that is positioned at the first end 144 of the pick shield 1003. The face flange 1038 has a size, such as, for example, a diameter or width that is larger than the corresponding diameter or width of the cross bore or cutout 1042 in one or both of the first and second walls 1030, 1032 such that, when the pick shield 1003 is positioned within the hollow space 1035 of the door 1030, the face flange 1038 abuts an outer surface of the first or second wall 1032, 1034, and thus is positioned outside of the adjacent cutout 1042 and the hollow space 1035 within the door 1030. Additionally, the face flange 1038 is offset from the interference tabs 1036 in the longitudinal direction by a distance that can correspond to a wall thickness (as generally indicated by "t" in FIG. 36) of the first or second wall 1030, 1032 of the door 1030. Thus, for example, the interference tabs 1036 can each extend from a first end 1044 that is adjoined to the outer wall 140 of the pick shield 1003 to a second end 1046 of the interference tab 1036, with the second end 1046 being offset from a rear side 1048 of the face flange 1038 by a distance, or gap 1050, that generally corresponds to the thickness (t) of the adjacent first or second wall 1030, 1032 of the door 1030. According to such an embodiment, as the pick shield 1003 is being inserted through a cutout 1042 in the first or second wall 1030, 1032 of the door 1030, the interference tabs 1036 are depressed by the wall(s) of the cutout 1042, which reduces the distance the interference tabs 1036 generally outwardly extend relative to at least the outer wall 140. Upon the interference tabs 1036 passing through the cutout 1042, the force that had downwardly depressed or compressed the interference tabs 1036 is released, and the interference tabs 1036 can return, including spring, back to their pre-depressed/pre-deformed size. As the interference tabs 1036 can be offset from the rear side 1048 of the face flange 1038 by the gap 1050, the return of the interference tabs 1036 to their pre-depressed/pre-deformed size can coincide with the rear side 1048 of the face flange 1038 contacting the adjacent first or second wall 1030, 1032 of the door 1030, thereby tightly securing a portion of the first or second wall 1030, 1032 within the gap 1050 between the interference tabs 1036 and the rear side 1048 of the face flange 1038. Further, the gap 1050 can be sized relative to the thickness of the first or second wall 1030, 1032 so as to at least assist in preventing or limit linear and/or rotational displacement of the pick shield 1003 relative to the door 1030. Thus, for example, the interference tabs 1036 and face flange 1038 can be configured to exert a force against at least the portion of the door 1030 positioned within the gap 1050, or vice versa.

Figure 37:
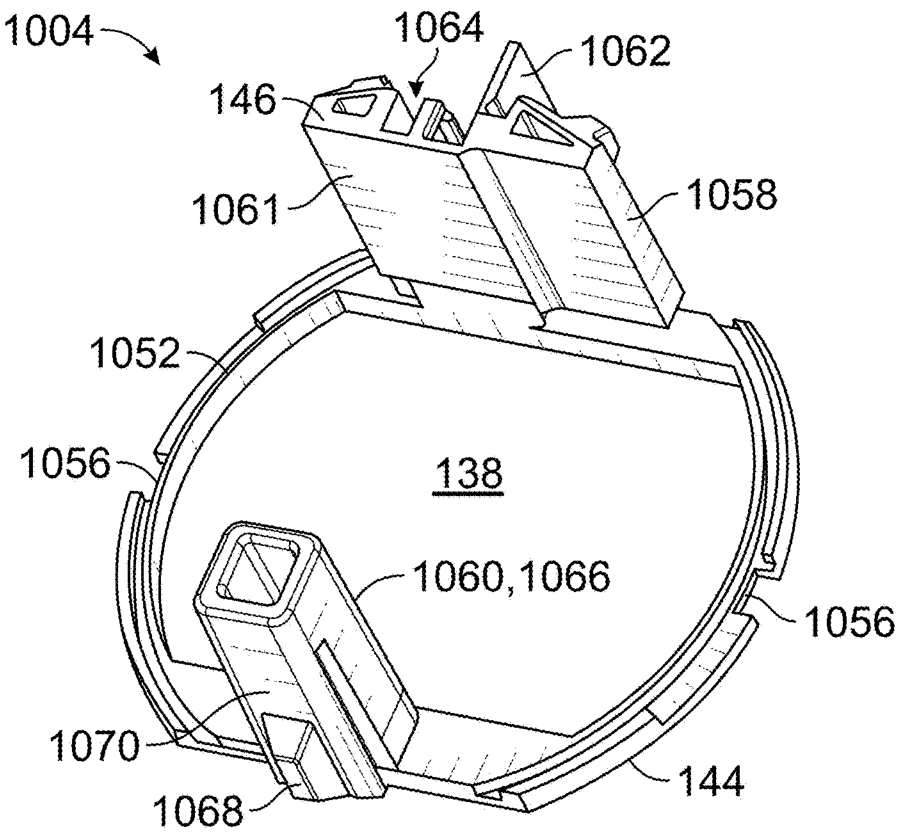
FIG. 37 illustrates a rear side perspective view of another embodiment of a pick shield.
Figure 38:
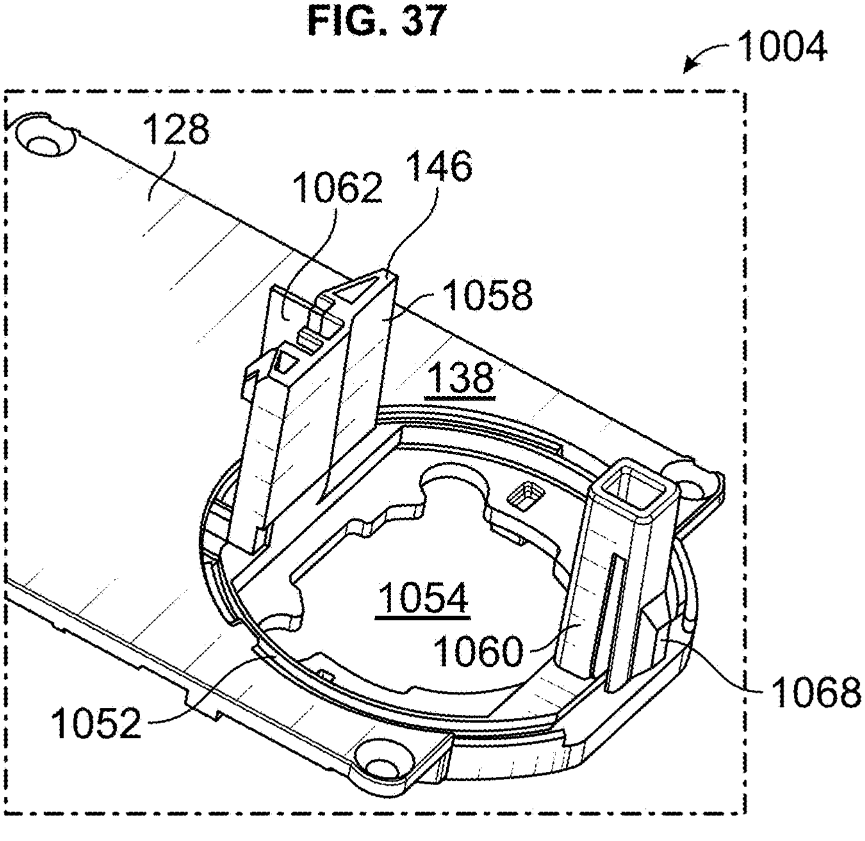
FIG. 38 illustrates a rear side perspective view of the pick shield shown in FIG. 37 couple to an exemplary backing plate.

FIGS. 37 and 38 illustrate an embodiment of another exemplary pick shield 1004. The illustrated pick shield 1004 includes a ring body 1052 that is configured for a press or snap engagement within a corresponding cavity 1054 in a backing plate 128. The ring body 1052, which can be constructed from plastic, can be deformed so as to engage with the walls of the backing plate 138 that define at least a portion of cavity 1054, and/or associated mating connectors or recesses within the cavity 1054 that are configured to retain an engagement between the ring body 1052 and the backing plate 138. For example, as seen by at least FIG. 37, the ring body 1052 can include a plurality of recesses 1056 that can matingly receive insertion of one or more projections from the cavity 1054 of the backing plate 138 in a manner that can at least assist in retaining an engagement between the backing plate 138 and the interference shield 1004.

The illustrated pick shield 1004 can include an upper shield 1058 and a lower shield 1060, only an end of both the upper shield 1058 and the lower shield 1060 each being joined to the ring body 1052 at the first end 144 of the pick shield 1004. Thus, the upper and lower shields 1058, 1060 can generally be each configured as a cantilever. Further, each shield 1058, 1060 can have a similar or dissimilar configuration. For example, the illustrated upper shield 1058 can include a base wall 1061 that extends along a plane that is generally orthogonal to a plane at which the associated interference tab 1062 extends. Additionally, a plurality of support ribs 1064 can be positioned about the base wall 1061 that can provide structural integrity and strength to the upper shield 1058. With respect to the lower shield 1060, in the illustrated example the lower shield 1060 has a generally rectangular body 1066 that, according to certain embodiments, can be at least partially hollow. However, the upper and lower shields 1058, 1060 can have a variety of other shapes and configurations.

Each of the upper and lower shields 1058, 1060 can include interference tabs 1062, 1068 in the form of projections that outwardly extend from the associated shield 1058, 1060 so as to increase a size, such as, for example, a diameter or width, of the pick shield 1004, as previously discussed. The interference tabs 1062, 1068 can have a variety of different configurations. For example, according to the illustrated example, the interference tab 1062 of the upper shield 1058 can be a generally elongated plate while the interference tab 1068 of the lower shield 1060 can be a projection or bump that outwardly extends from a lower surface 1070 of the lower shield 1060. According to such embodiment, as the pick shield 1004 is inserted into a cross bore 122, the interference tabs 1062, 1068 of the upper and lower shields 1058, 1060, respectively, can each engage an adjacent wall(s) 123 of the cross bore 122 in a manner that can deflect the cantilevers provided by the upper and lower shields 1058, 1060, thereby providing a force between the engagement of the upper and lower shields 1058, 1060 and the wall(s) 123 of the cross bore 122 that can limit movement of the pick shield 1004 relative to the door 102, as previously discussed.

Figure 39:
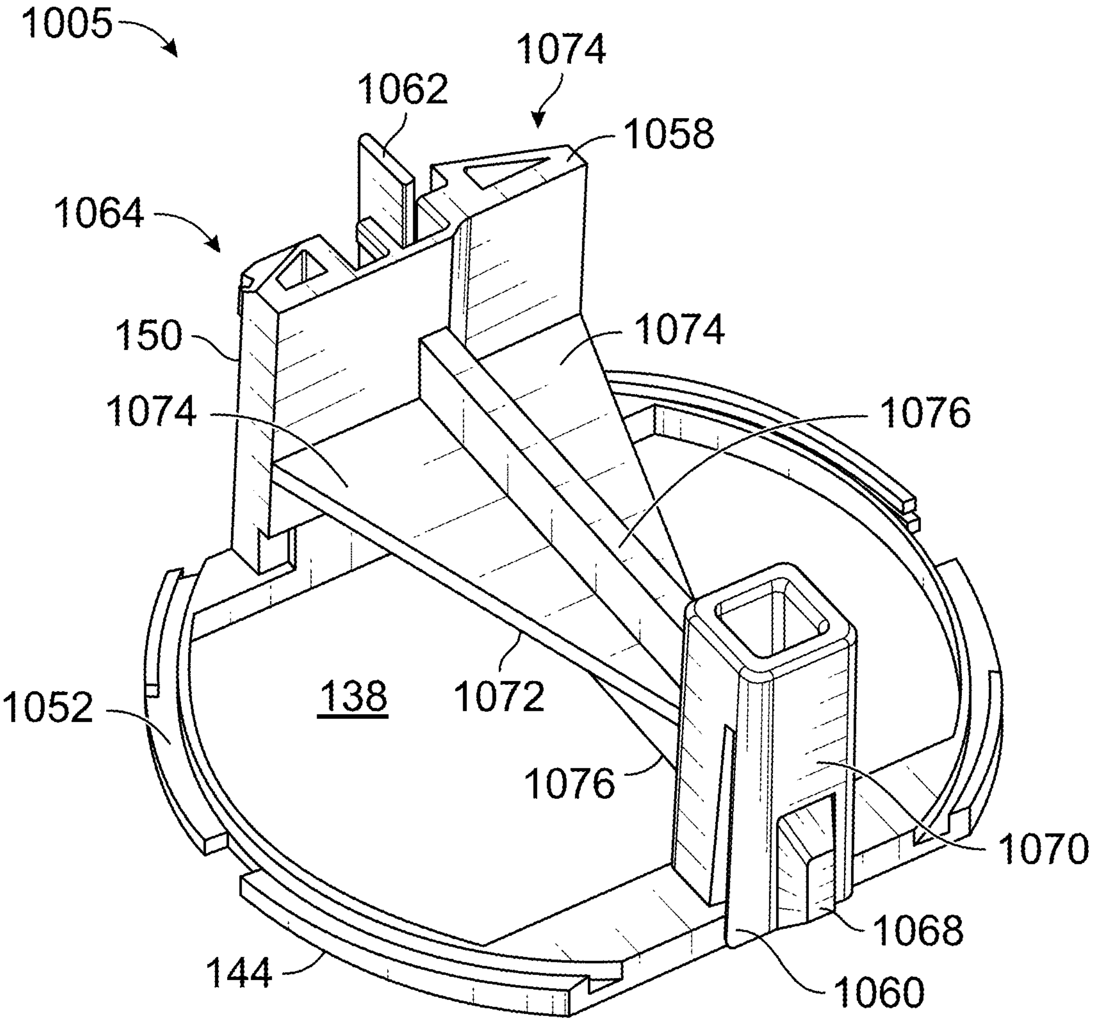
FIG. 39 illustrates a rear side perspective view of another embodiment of a pick shield.

FIG. 39 illustrates a rear side perspective view of another embodiment of a pick shield 1005. The pick shield 1005 shown in FIG. 39 is generally similar to the pick shield 1004 shown in FIGS. 37 and 38, but further includes a support body 1072 that extends between the upper and lower shields 1058, 1060. The support body 1072 can be offset from the ring body 1052, but is also positioned relative to the ring body 1052 to accommodate a downward deflection or deformation of the upper and lower shields 1058, 1060 in a manner that is generally similar to that attained by the cantilever configuration discussed above with respect to FIGS. 37 and 38. Moreover, the support body 1072 can, according to certain embodiments, be configured to further booster the generally outwardly directed force the interference tabs 1062, 1068 of the upper and lower shields 1058, 1060 can exert against the corresponding adjacent portion of the wall(s) 123 of the cross bore 122 in a manner that can retain a position of the pick shield 1005 relative to the door 102, as discussed above.

The support body 1072 can have a variety of different shapes and configurations. For example, according to the illustrated embodiment, the support body 1072 can include a lateral support wall 1074 and a longitudinal support wall 1076, the longitudinal support wall 1076 being generally orthogonal to the lateral support wall 1074. As shown in FIG. 39, according to certain embodiments, the lateral support wall 1074 and the longitudinal support wall 1076 can extend from the upper shield 1058 to the lower shield 1060. Additionally, according to certain embodiments, the lateral support wall 1074 can extend from opposing sides of the longitudinal support wall 1076, and the longitudinal wall 1076 can similarly extend from opposing sides of the lateral support wall 1074 so that the support body 1-72 has a generally cross or "x" cross-sectional shape. Further, the longitudinal support wall 1076 can generally bisect the lateral support wall 1074, and the lateral support wall 1074 can generally bisect the longitudinal support wall 1076. Additionally, as seen in FIG. 39, the longitudinal support wall 1076 can be generally inwardly tapered as the longitudinal support wall 1076 extends from the upper shield 1058 to the lower shield 1060 so as to also have a generally triangular cross-sectional shape.

Figure 40:
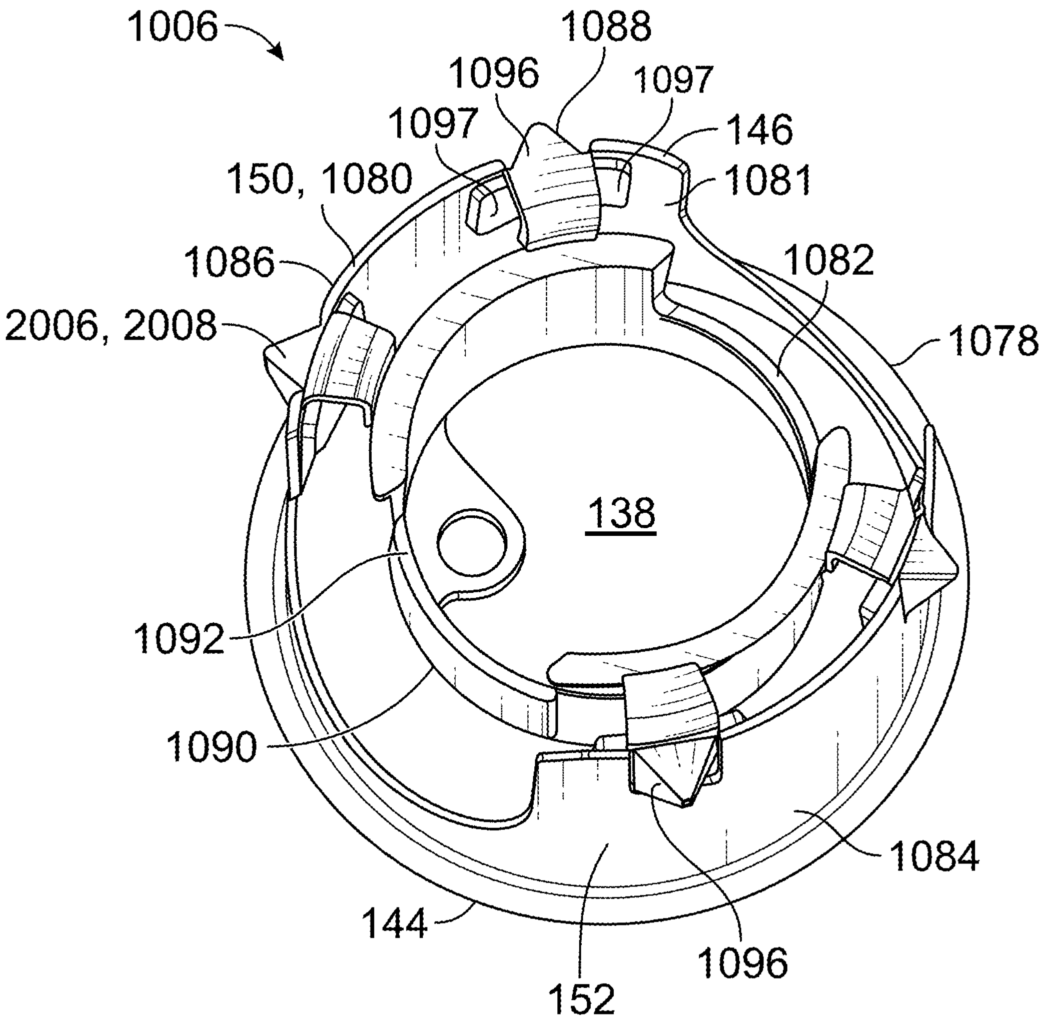
FIG. 40 illustrates a rear side perspective view of another embodiment of a pick shield.
Figure 41:
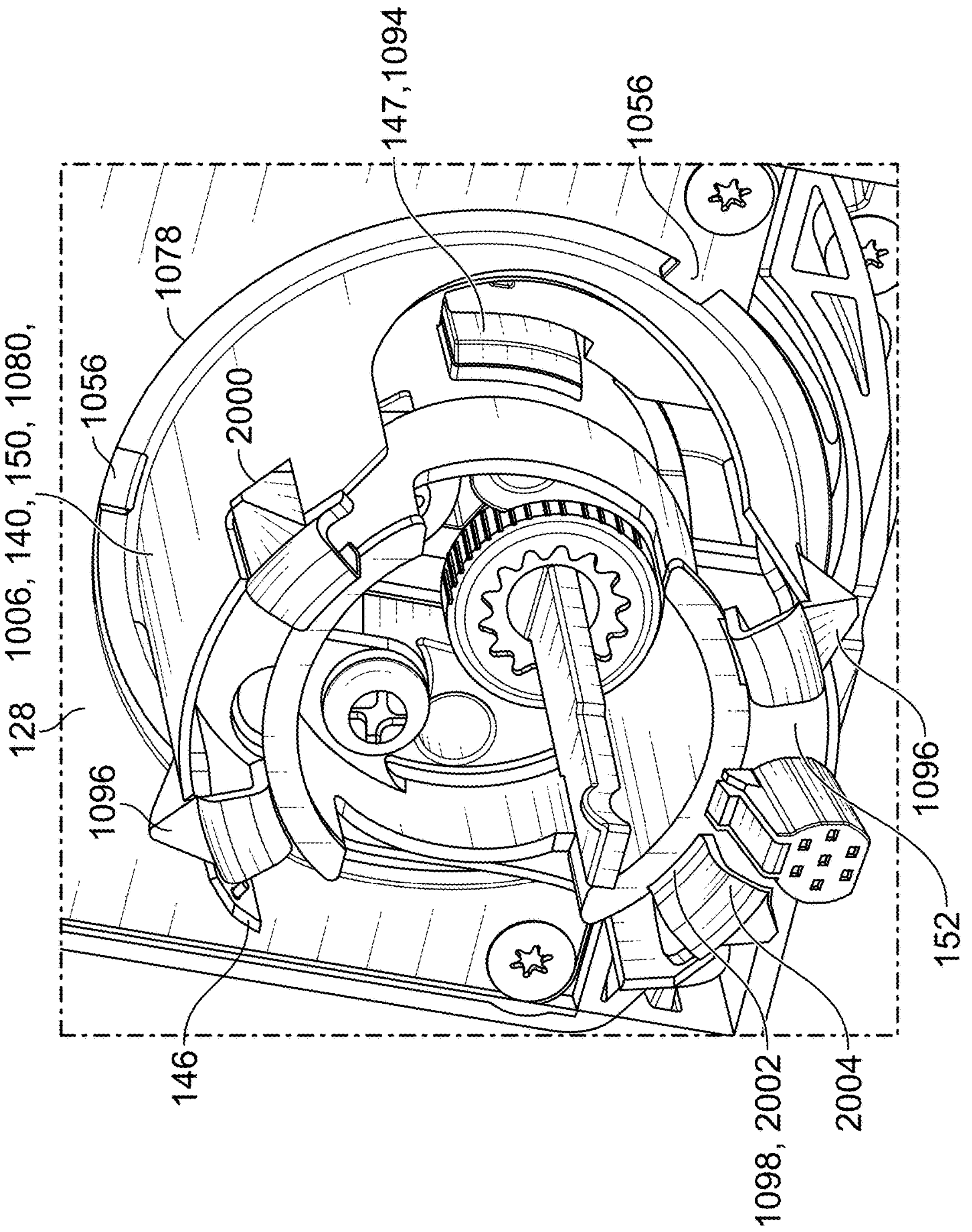
FIG. 41 illustrates a rear side perspective view of the pick shield shown in FIG. 40 couple to an exemplary backing plate.

FIGS. 40 and 41 illustrate another exemplary embodiment of a pick shield 1006. The illustrated pick shield 1006 can include a ring body 1078 that can be generally similar to the ring body 1052 discussed above with respect to at least FIG. 37, including, for example, with respect to being configured to securely engage the base plate 138, such as, for example, via a snap or press fit, among other forms of engagement. The pick shield 1006 can further include a plurality of shields 1080 that can be similar to the shields 152 discussed above. Thus, for example, the pick shield can include both an upper and lower shield 1080, among other shields. A first end 1084 of each shield 1080 can extend from the ring body 1078 in a longitudinal direction to a second end 1086 of the shield 1080. One or more, if not all, of the pick shields 1080 can further include at least one recess 1088 that is positioned and sized to receive insertion of an interference tab 1096. Thus, while the pick shield 1006 can have a plurality of recesses 1088, the recesses 1088 can be positioned at a variety of locations about the associated shield 1080. For example, according to certain embodiments, the shields 1080 can each have a plurality of recesses 1088, with one or more of the recesses 1088 being positioned adjacent to the second end 1086, including, for example, the second end 1086 of the shield 1080. Additionally, according to certain embodiments, each recess 1088 can be sized and shaped to generally conform to the size and shape of the portion of the interference tab 1096 that extends through the recess 1088.

The pick shield 1006 can further include and inner ring 1082 that is inwardly offset from, and generally concentric with, the shields 1080. According to certain embodiments, the inner ring 1082 can be coupled to the ring body 1078 and/or a shield 1080 by one or more struts 1094. However, according to other embodiments, the interference tabs 1096 can include one or more extensions 1097 that are size and position to pressingly abut against and inner surface 1081 of an adjacent shield 1080 in a manner that can secure the inner ring 1082 to the inner ring 1082 to the shield 1080. Additionally, or alternatively, the backing plate 138 can include a collar 147 that can be configured to engage with the inner ring 1082 in the manner that can secure a position of the inner ring 1082 relative to at least the ring body 1078 and/or the shields 1080.

According to the illustrated embodiment, the inner ring 1082 can extend from a first end 1090 to a second and 1092 of the inner ring 1082. The inner ring 1082 can further be configured to include the one or more interference tabs 1096. While the interference tabs 1096 can be positioned at a variety of locations about the inner ring 1082, according to the illustrated embodiment the interference tabs 1096 at least upwardly extend from, or around, the second end 1092 of the inner ring 1082. The interference tabs 1096 can extend from a first end 1098 to a second end 2000 of the interference tab 1096, and can have a first portion 2004 and a second portion 2006. The first portion 2004 can include, or extend from, a hinge portion 2004 that can accommodate displacement, including bending, deflection, or deformation of the interference tab 1096 relative to at least the inner ring 1082. While the first portion 2004 can have a variety of shapes and configurations, according to the illustrated embodiment, the first portion 2004 can have a generally "L" shape in which the first portion 2004 extends in a generally longitudinal direction away from the inner ring 1082, and further extends in a generally vertical direction away from the inner ring 1082 and towards the adjacent shield 1080. The second portion 2006 can extend from the first portion 2004 to the second end 2000 of the interference tab 1096. Additionally, the second portion 2006 can include a protrusion 2008 that is configured to extend through an adjacent recess 1088 in a shield 1080 and is configured to contact a corresponding wall(s) 123 of the cross bore 122. Further, in the illustrated embodiment, the protrusion 2008 can have a shape that can at least assist with the interference tab 1096 forming an indentation or depression in, or otherwise dig into the material of, the wall(s) 123 of the cross bore 122 in a manner that can further assist in retaining the position of the pick shield 1006 within the cross bore 122. For example, as seen in at least FIGS. 40 and 41, the protrusion 2008 can have an apex, point, or other configuration that can facilitate the formation of the local indentation or depression in the material of the wall(s) 123 that defines the cross bore 122 so as to increase a traction or grabbing action of the protrusion 2008 against the wall(s) 123 of the cross bore 122.

Figure 43:
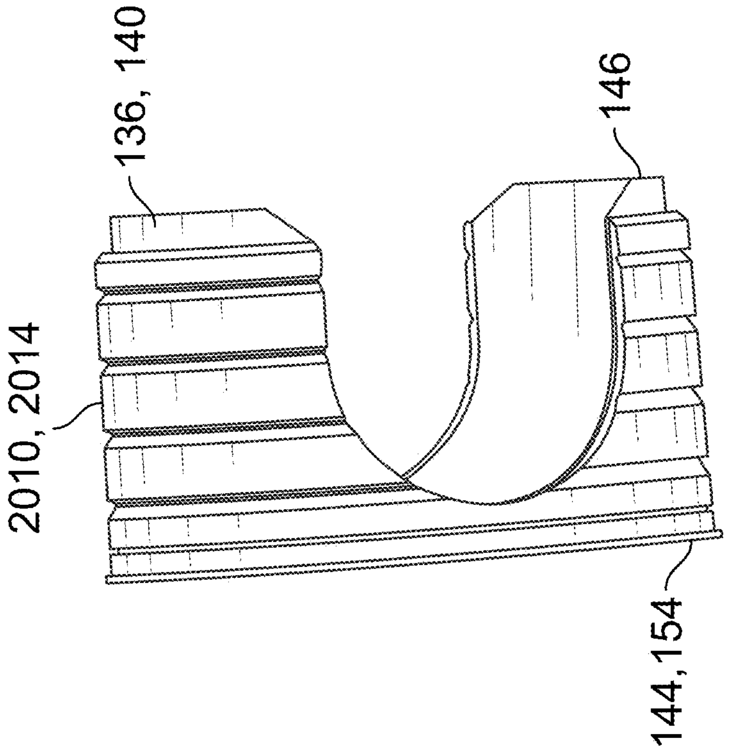
FIG. 43 all straight to pick shield assembly that includes the compressible sleeve shown in FIG. 42 positioned about an outer surface of a pick shield.
Figure 42:
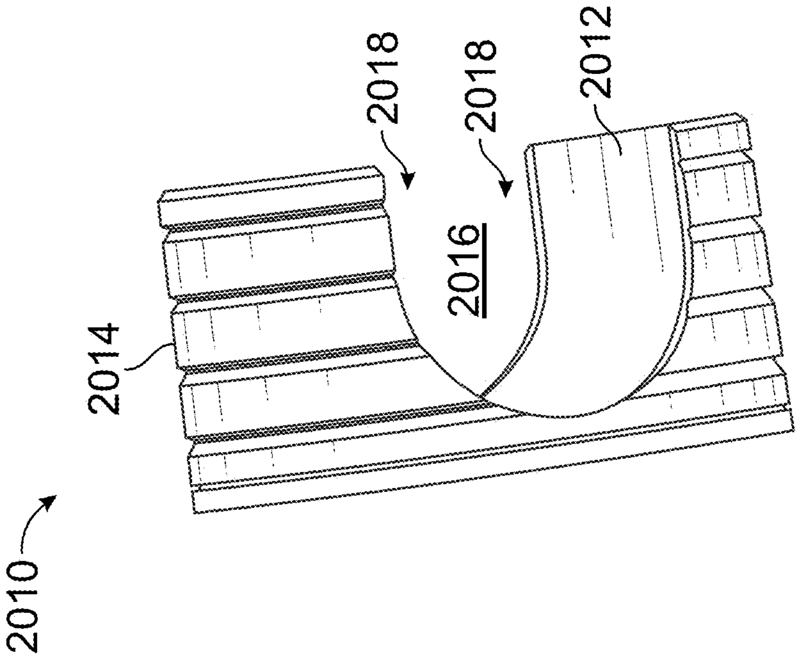
FIG. 42 illustrate the side perspective view of a compressible gasket or sleeve for a pick shield.

FIGS. 42 and 43 illustrate a compressible gasket or sleeve 2010 positioned about at least a portion of an outer surface of a pick shield. Moreover, the sleeve 2010 is configured for deformable placement about a portion of the pick shield, including, for example, but not limited to, the pick shield 136 shown in at least FIG. 9. The sleeve 2010 can include an inner surface 2012 and an outer surface 2014, the inner surface 2012 being configured to generally define a bore 2016 of the sleeve 2010. According to the illustrated embodiment, the bore 2016 can have a size, such as, for example, a diameter, that is generally similar to a corresponding size of at least a portion of the outer wall 140 such that the outer wall 140 can be received within the bore 2016. Additionally, or alternatively, the bore 2016 can be sized so as to be stretched or otherwise deform the sleeve 2010 when the sleeve 2010 is positioned about the outer wall 140 in a manner that can assist in retaining the sleeve 2010 in engagement with the pick shield 136. Optionally, according to certain embodiments, the sleeve 2010 can be fastened to the pick shield 136, including, for example, the outer wall 140, by use of a mechanical fastener or adhesive, among other manners of coupling the sleeve 2010 to the pick shield 136. Thus, according to certain embodiments, the sleeve 2010 can be glued onto the pick shield 136, among other manners of attachment.

The outer surface 2014 of the sleeve 2010 can have a size, such as, for example, an interference diameter or width, that is larger than the corresponding size of the cross bore 122. As the sleeve 2010 is constructed from a deformable material, including, for example, and elastomeric material or rubber, among other materials, the sleeve 2010 can be compressed via engagement with the wall(s) 123 that define the cross bore 122 in a manner that can press the sleeve 2010 into the cross bore 122 while the sleeve 2010 is attached to the pick shield 136. Such a pressing engagement between these sleeve 2010 and the wall(s) 123 of the cross bore 122 can provide a force that can assist in retaining a linear and/or angular position of the pick shield 136 relative to the cross bore 122 and/or the door 102.

While FIGS. 29-32 illustrate a variety of configurations of pick shields 1000-1006, including interference tabs and sleeves, the features discussed above with respect to those exemplary embodiments can be used in various combinations with one or more of the features discussed with respect to at least the pick shields 136, 300, 400, 500, 600, 700 shown in at least FIGS. 3-28, including, but not limited to, with the various attachment bodies 156, 302, 402, 502, 602, 702 discussed herein. Moreover, the various pick shield embodiments discussed herein are not mutually exclusive, and can be utilized with various features or combination of features from one or more other pick shields discussed herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A pick shield for a door lock assembly that includes a bolt portion having a bolt and a shield mount securely coupled to a backing plate, the pick shield comprising:

a shield that at least partially defines a cavity of the pick shield, the cavity sized to receive placement of at least a portion of the bolt portion, the shield configured to extend above or below at least a portion of the bolt portion at a location that accommodates at least a portion of the bolt being extendable from the cavity in a direction that is generally perpendicular to a central longitudinal axis of the pick shield; and an attachment body having an arm portion and an aperture portion, the arm portion inwardly extends into the cavity in at least a direction toward the central longitudinal axis of the pick shield, the aperture portion configured to restrict, with the shield mount securely affixed to the backing plate, the pick shield to a single degree of freedom relative to at least the backing plate as the pick shield is displaced with at least a portion of the shield mount in the aperture portion from a detached position to an attached position, the attachment body being further configured to securely retain a position of the pick shield relative to at least the backing plate at least upon the pick shield reaching the attached position in a manner that resists movement of the pick shield independent of the backing plate.

2. The pick shield of claim 1, wherein the single degree of freedom is a rotation movement about the central longitudinal axis.

3. The pick shield of claim 2, wherein the aperture portion includes a passageway and an aperture opening, the passageway extends from an inlet that extends through a sidewall of the arm portion to the aperture opening, the sidewall defining at least a portion of a shape of an anterior portion of the arm portion, and wherein, at the attached position, at least a portion of the shield mount is positioned in the aperture opening.

4. The pick shield of claim 3, wherein the attachment body comprises a first attachment body and a second attachment body.

5. The pick shield of claim 4, wherein the aperture opening for each of the first attachment body and the second attachment body is positioned about a mounting diameter.

6. The pick shield of claim 5, wherein the passageway for both the first attachment body and the second attachment body extends in a curved configuration about a portion of the mounting diameter.

7. The pick shield of claim 6, wherein the first attachment body and the second attachment body are inwardly offset from an orifice of the cavity, the orifice being located at a first end of the pick shield.

8. The pick shield of claim 1, wherein the single degree of freedom is a linear displacement in a direction that is perpendicular to the central longitudinal axis.

9. The pick shield of claim 1, wherein the single degree of freedom is a linear displacement in a direction that is parallel to the central longitudinal axis.

10. The pick shield of claim 1, wherein the shield mount is a mounting post of the door lock assembly.

11. A pick shield for a door lock assembly that includes a bolt portion having a bolt and a shield mount securely mounted to a backing plate, the pick shield sized for placement in a cross bore of a door and comprising:

an outer wall comprising an upper shield and a lower shield, the outer wall defining a cavity sized to receive placement of at least a portion of the bolt portion, a recess positioned between the upper shield and the lower shield at a location that accommodates passage of at least a portion of the bolt out of the cavity through the recess; and an interference tab that outwardly extends beyond the outer wall to provide the pick shield with an adjustable interference size that is larger than a corresponding size of the outer wall, the interference tab being configured for selective displacement from a rest position to a displaced position by an engagement of the interference tab with a wall that defines at least a portion of the cross bore, the interference tab further configured to exert an at least outwardly directed force against the wall that assists in a retention of a position of the pick shield within the cross bore.

12. The pick shield of claim 11, wherein the interference tab comprises a plurality of interference tabs, and wherein the adjustable interference size is a diameter.

13. The pick shield of claim 11, wherein the interference tab is coupled to the outer wall by a hinge.

14. The pick shield of claim 11 further including a face flange, and wherein the interference tab includes a first end and a second end, the first end being coupled to the outer wall, the second end being separated from the outer wall, the second end also separated from the face flange by a gap, the gap being sized to receive a placement of a portion of a wall of the door between the second end and the face flange.

15. The pick shield of claim 11, wherein the pick shield includes an inner ring that is inwardly offset from the outer wall, wherein the interference tab extends from the inner ring through a recess in the outer wall.

16. The pick shield of claim 11, further including at least two attachment bodies having an arm portion and an aperture portion, the arm portion inwardly extends into the cavity in at least a direction toward a central longitudinal axis of the pick shield, the attachment body configured to restrict the pick shield to a single degree of freedom at least as the pick shield is displaced, with a portion of at the shield mount in the aperture portion, from a detached position to an attached position, and wherein the at least two attachment bodies being configured to, at least upon the pick shield reaching the attached position, securely couple the pick shield to at least the backing plate in a manner that prevents movement of the pick shield independent of movement of the backing plate.

17. A method for securely coupling a pick shield to a plate of a door lock assembly that includes a bolt portion having a bolt, the method comprising:

securing a shield mount to the plate;

placing a portion of the shield mount within a portion of an aperture portion of an attachment body of a pick shield, the pick shield having an outer wall that at least partially defines a cavity and a shield, the cavity sized to receive placement of at least a portion of the bolt portion at a location above or beneath the shield and to accommodate selective extension of at least a portion of the bolt out of the cavity in a direction that is generally perpendicular to a central longitudinal axis of the pick shield;

displacing, with a portion of the secured shield mount in the aperture portion, the pick shield from a detached position and toward an attached position, the aperture portion configured to confine the pick shield to a single degree of freedom of movement relative to at least the plate as the pick shield is being displaced from the detached position to the attached position; and securely affixing, by displacing the pick shield to the attached position, the pick shield relative to at least the plate in a manner that resists displacement of the pick shield independent of displacement of the plate.

18. The method of claim 17, wherein displacing the pick shield comprises rotating the pick shield about the central longitudinal axis.

19. The method of claim 17, wherein displacing the pick shield comprises linearly displacing the pick shield in a direction that is perpendicular to the central longitudinal axis.

20. The method of claim 17, wherein displacing the pick shield comprises linearly displacing the pick shield in a direction that is parallel to the central longitudinal axis.

* * * * *